United States Patent [19]
Fukuda et al.

[11] Patent Number: 5,835,830
[45] Date of Patent: Nov. 10, 1998

[54] IMAGE FORMING APPARATUS

[75] Inventors: Yuichi Fukuda; Tsukasa Matsuda; Tatsuo Okuno; Takayuki Yamashita; Kazuhiko Arai, all of Ashigarakami-gun, Japan

[73] Assignee: Fuji Xerox Co., Ltd., Tokyo, Japan

[21] Appl. No.: 853,491

[22] Filed: May 8, 1997

[30] Foreign Application Priority Data

May 10, 1996 [JP] Japan .................................. 8-116466

[51] Int. Cl.⁶ ........................ G03G 15/14; G03G 15/20
[52] U.S. Cl. ........................ 399/307; 399/308; 399/322
[58] Field of Search ................................ 399/307, 308, 399/302, 323, 148, 322; 430/97

[56] References Cited

U.S. PATENT DOCUMENTS

| | | | |
|---|---|---|---|
| 2,990,278 | 6/1961 | Carlson . | |
| 5,493,373 | 2/1996 | Gundlach et al. . | |
| 5,530,534 | 6/1996 | Dalal . | |
| 5,537,194 | 7/1996 | Henry et al. . | |
| 5,568,235 | 10/1996 | Amarakoon . | |
| 5,585,905 | 12/1996 | Mammino et al. | 399/272 |
| 5,612,773 | 3/1997 | Berkes | 399/307 |
| 5,629,761 | 5/1997 | Theodoulou et al. | 399/307 |
| 5,678,126 | 10/1997 | Rathbun | 399/30 |
| 5,689,763 | 11/1997 | Rathbun et al. | 399/53 |
| 5,706,095 | 1/1998 | Rathbun | 399/57 X |
| 5,708,937 | 1/1998 | Lestrange et al. | 399/239 |
| 5,708,950 | 1/1998 | Badesha et al. | 399/333 |

FOREIGN PATENT DOCUMENTS

| | | |
|---|---|---|
| B-46-41679 | 12/1971 | Japan . |
| A-2-108072 | 4/1990 | Japan . |
| A-5-19642 | 1/1993 | Japan . |
| A-5-107950 | 4/1993 | Japan . |
| A-5-249798 | 9/1993 | Japan . |

OTHER PUBLICATIONS

Masatoshi Kimura et al., Electrostatic Transfer of Toner Image, vol. 19, No. 1 pp. 25–32 (1981).

*Primary Examiner*—R. L. Moses
*Attorney, Agent, or Firm*—Oliff & Berridge, PLC

[57] ABSTRACT

An image forming apparatus is disclosed which comprises
a toner-image holding unit for holding a toner image,
a recording medium,
transfer-fixing means for bringing the recording medium into contact with the toner image on the toner-image holding unit and heating the toner image so as to transfer and fix the toner image onto the recording medium,
toner-image cooling means for cooling the toner image transferred and fixed onto the recording medium so as to suppress the flowing of the toner image, and
peeling means for peeling the recording medium off the toner-image holding unit.

11 Claims, 14 Drawing Sheets

PEELED OFF IMMEDIATELY AFTER NIP

PEELED OFF AFTER TRANSFERING AND COOLING AFTER NIP

THE ENLARGED PHOTOGRAPHS OF LINES/INCH ARRANGEMENT [ 200 LINE/INCH ], COAT PAPER J

IMAGE FORMING APPARATUS

BACKGROUND OF THE INVENTION

The present invention relates to an image forming apparatus such as a printer or a copying machine adopting a simultaneous transfer-fixing system in that a toner image indicating the gradation of image density by area modulation is formed and transferred onto a recording medium and simultaneously fixed to the recording medium at the time of transfer.

Image forming apparatus heretofore in wide use adopt an image forming technique comprising the steps of forming an electrostatic latent image on a photoconductor, developing the image as a toner image with dry toner, transferring and fixing the toner image electrostatically to a recording medium. However, there still exist problems arising from such an image forming technique, including non-uniformity in the image density, the scattering of toner particle in the transfer process, and inferior resolution and dot reproducibility.

The reason for this is mainly attributable to the process of electrostatically moving the toner image on the photoconductor to the recording medium; in other words, the toner image formed on the photoconductor is impossible to transfer uniformly and efficiently. Although the toner transfer efficiency rises in proportion to the electric field (hereinafter referred to as Et) applied to the toner layer, the so-called Paschen's discharge is caused by a certain measure of electric field to lower the transfer efficiency as the Et lowers; that is, the transfer efficiency has a peak at a certain Et value. The peak value of the transfer efficiency is not 100% but said to be about 95% at the utmost (See Electrostatic Transfer of Toner Image, Electrophotography Society Journal, Vol. 19, No. 1 pp 25–32 (1981)). Since the transfer efficiency of a toner layer is dependent on Et, the transfer efficiency tends to vary with the thickness of the toner layer or the transfer position on the recording medium unless Et is constant without relying on the thickness of the toner layer, the unevenness of the recording medium represented by paper or the irregularity of electrical physical properties of the paper. When the toner image formed on the photoconductor is monochromatic and thin in thickness, the unevenness of the recording medium and the irregularity of electrical physical properties cause image irregularity. This is also the case where independent monochromatic toner images formed on the photoconductor are superposed on the recording medium and transferred, and the image irregularity is also caused by the unevenness of the recording medium or the irregularity of electrical physical properties. In other words, though the difference between a portion subjected to multiple transfer and what is not subjected to multiple transfer but to monochromatic transfer is electrostatically suppressible, it is difficult to compensate for the unevenness of the recording medium and the irregularity of electrical physical properties. In the case of a so-called intermediate transfer in which monochromatic toner images independently formed on the photoconductor are subjected to the multiple transfer onto an intermediate medium without unevenness but with the controlled physical properties, on the other hand, a uniform image free from irregularity is formed on the intermediate medium. The toner image on the intermediate medium is multi-colored and ranges from a portion where more than three layers of single-color toner are superposed up to another where one layer or less is superposed. Even when an attempt is made to electrostatically transfer these layers collectively and uniformly onto the recording medium represented by paper, a constant electric field is difficult to apply over the whole area of the toner image and consequently Et becomes non-uniform in the different portions of the toner image. Consequently, a color image resulting from superimposing colors on the intermediate medium is not wholly transferred to the recording medium in the electrostatic transfer system and part of the image is left on the intermediate medium. Moreover, the residual quantity varies with the thickness of the toner layer formed on the intermediate medium. Therefore, the color balance of the color image obtained on the recording medium is shifted and a desired color image is unobtainable. Due to the unevenness of the surface of paper as the recording medium, the paper fails to adhere to the intermediate medium completely, thus causing a non-uniform gap to be produced. Accordingly, the transfer electric field becomes non-uniform and toner-to-toner Coulomb's repulsion force induces the toner to scatter, which deteriorates the image quality.

In view of the foregoing problems, the Examined Japanese Patent Application Publication No. Sho 46-41679 discloses a method of melt-transferring toner thermally from an intermediate medium to a recording medium after adhesion-transferring a toner image formed on a photoconductor to the intermediate medium. Since the toner image is transferred non-electrostatically to the recording medium in this method, the image quality is hardly deteriorated in the aforementioned transfer process.

Moreover, the Unexamined Japanese Patent Application Publication No. Hei 2-108072, for example, discloses a technique of obtaining a color image by electrostatically superimposing toner images of different colors and transferring the images to an intermediate medium, melting the multicolor and multiplex toner image on the intermediate medium, transferring and fixing the melted multiplex toner image to a recording medium. According to this method, the image quality is hardly deteriorated likewise since the toner image is non-electrostatically transferred to the recording medium. This method is called a simultaneous transfer-fixing system.

With respect to image forming apparatus employing the simultaneous transfer-fixing system, U.S. Pat. No. 2,990, 278, the Unexamined Japanese Patent Application Publications Nos. Hei 5-19642, Hei 5-107950 and Hei 5-249798 also discloses a technique of transferring a toner image from an intermediate medium to a recording medium by adhesion-heating and pressing the intermediate medium and the recording medium together, cooling both the media until the toner-to-toner cohesive force becomes greater than the adhesive force between the toner and the intermediate medium and then peeling the recording medium off the intermediate medium. The arrangement above makes it possible to obtain an image of excellent quality in toner transfer efficiency, color balance, glossiness and toner transparency.

The present inventors utilized the simultaneous transfer-fixing system for an image forming apparatus which uses light subjected to intensity modulation according image information as exposure light for indicating density gradation with a continuous variation in the quantity of sticking toner and made studies concerning image formation. As a result, the present inventors found out that though the image quality was prevented from being deteriorated because of the turbulence of a toner image and toner-to-toner Coulomb's repulsion force in the medium and high density portion, the transfer-fixing ratio was low and graininess was bad in a highlight area; that is, the toner was hardly sufficiently moved to the recording medium and the image deterioration remained unremedied in comparison with the electrostatic transfer system normally employed or was seen to have increased.

When energy to be given at the transfer-fixing time is increased in order to improve the transfer fixing ratio and the image quality in the highlight area, the transfer-fixing ratio was seen to improve even in the highlight area but background area contamination called high background density occurred over the whole image. Moreover, uneven fixing and non-uniform glossiness occurred because of excessive toner fixation in the high density portion where the quantity of toner was large.

The further pursuit of reasons why the aforesaid problem of highlight reproducibility arose revealed that because energy at the transfer-fixing time was hardly transmitted to the toner sparsely distributed in the highlight area due to the uneven surface of paper and because toner-to-toner cohesion hardly took place, the toner is hardly sufficiently moved to the recording medium.

The present inventors confirmed the fact that it was important to have the individual toner in the form of powder gathered even in the highlight area to form pixels, so that the simultaneous transfer-fixing system was used to obtain a highlight image of good quality. With the toner thus gathered, energy at the transfer-fixing time is readily transmitted to the toner without being affected by the uneven surface of paper and thus toner-to-toner welding and cohesive force effectively works.

It is achievable forming pixels resulting from gathering toner in the highlight area as follows:

When a light beam is used for optically scanning the photoconductor, pulse width modulating exposure using a screen generator is carried out to reproduce the density gradation of an image, so that an electrostatic latent image corresponding to an image signal is formed on the photoconductor. A pulse width modulating means determines the on-off time of the light beam in response to the image signal, whereby the latent image corresponding to the image signal is formed on the photoconductor. The electrostatic latent image is formed into an image by toner later and thus image formation is carried out. With respect to the number of screen lines, at least 150 lines/inch (lpi) or greater is said to be required to make them visually unrecognizable with reference to visual factors (VTF) of FIG. 1. While the number of lines is maintained in this case, image formation for reproducing at least gradation of 50 or greater is targeted and an image satisfying this condition is called a medium contrast image.

Although an on-off binary image indicative of density gradation by area modulation is intended for a toner image, the contrast of an exposure profile in the highlight area is lowered and rendered analog. Since a quantity of exposure itself is small, reproducibility of dots and lines/inch tends to become deteriorated in the developed image state prior to the transfer process. In the highlight area to which attention has been directed in this case, a developed image as pixels with gathered toner can hardly be formed and is set close to such a state that powder toner is scattered and sparsely distributed. This is equal to a case where the density gradation is indicated by continuously varying the adhering quantity of toner due to intensity modulated light corresponding to image information, and the image in the highlight area to which the simultaneous transfer-fixing system is applied is such that not only the transfer-fixing efficiency but also graininess worsens.

FIGS. 2 to 4 show exposure energy profiles on photoconductors when the photoconductors are exposed by the use of a pulse width modulating means. FIGS. 2, 3, 4 show the results obtained when the value of D=dB/dp ranges from 1/1 to 1/2 and 1/3 given that the ratio dB/dp of the adjoining pixel-to-pixel distance dp (mm) in main scan direction to the light beam spot diameter dB is D. The light beam spot diameter dB (mm) in any one of the cases above remains constant.

In order to prevent toner from sticking to the background area, a bias potential is applied at the time of development in electrophotography. FIGS. 2 to 4 also show a boundary line equivalent to the bias potential in an inverted phenomenon in which the exposure portion is developed.

As is obvious from FIG. 2, the contrast of the exposure energy profile is lowered and rendered analog as pulse width (%) is reduced. The quantity exceeding the boundary line equivalent to the bias potential is reduced, which makes the dots and lines/inch hardly reproducible.

The smaller the value of D is rendered from 1/1 to 1/2 and 1/3, the more reduction in the contrast is suppressed as shown in FIGS. 2 to 4 and when the light beam spot diameter dB is assumed constant, the reproduction of the dots and lines/inch in the low density portion is improved by decreasing not only the number of lines N but also lines/inch. Although 10% of the highlight area is made reproducible by reducing the value of D to about 1/2, the surface potential profile of the photoconductor is analog and the developed toner tends to become scattered. In order to maintain the intended image structure in the highlight area and form pixels with gathered toner, it is therefore important to make the value of D less than 1/2, preferably about 1/3.

With the use of a photoconductor which hardly produces potential attenuation with respect to weak light input and exhibits photopotential attenuation characteristics for producing greater potential attenuation responsively when certain intensity of light input is exceeded, dots and lines/inch of 10% of the input image signal are stably reproduced when the value of D is about 1/2 and the surface potential of the photoconductor becomes digital. Consequently, the scattering of the developed toner is reduced, whereby pixels with gathered toner are formed.

FIGS. 5 to 6 show the results of simulating electrostatic latent images formed on photoconductors when the photoconductors with photopotential attenuation characteristics shown in FIGS. 7 to 8 are employed so as to effect scan-exposure using the light beams based on image signals equivalent to the highlight areas. The value of D in either case is set to 1/2.

As is obvious from FIGS. 5 to 8, the use of the photoconductor having the photopotential attenuation characteristics shown in FIG. 7 causes the surface potential profile of the photoconductor to be more digitized and consequently the scattering of the developed toner is reduced.

The surface potential profile in the highlight area is also seen in each pixel of the end portion of the toner image in the medium density portion. In other words, with the conditions under which the analog surface potential profile is formed in the highlight area, the end portion of each pixel in the medium density portion becomes obscure and the toner also becomes scattered. With the conditions under which the digital surface potential profile is formed in the highlight area, on the contrary, the toner hardly becomes scattered, and the end portion of each pixel in the medium density portion becomes distinct.

The toner thus formed on the photoconductor is directly pressed against, transferred and fixed onto a recording medium. Since toner is gathered to form pixels, the toner is least scattered even in the electrophotographic process using powder toner and the toner image in the highlight area is transferred with excellent transfer efficiency. More specifically, the toner image with the gathered toner is formed under proper image forming conditions, whereby the image forming apparatus of the simultaneous transfer-fixing is provided. Therefore, there is provided a screen structure which is excellent in transfer-fixing efficiency even in the highlight area, has a greater number of lines, thus making the lines visually unrecognizable, and besides makes a distinct, good quality image available.

The present inventors made further studies on the provision of an image forming apparatus capable of indicating density gradation through the area modulation method, and image formation by utilizing the simultaneous transfer-fixing system with the conditions under which, as described above, pixels with gathered toner were formed even in a highlight area.

The proper condition for forming pixels with gathered toner in this case means that, when the contrast between the reflectance of a toner portion (e.g., a portion where the surface potential |V| of the photoconductor is higher than developing bias potential (DC) in FIG. 5) and that of a non-toner portion (e.g., a portion where the surface potential |V| of the photoconductor is lower than developing bias potential (DC) in FIG. 5) with an image area factor being 100% is assumed 1 in the case of a toner image on the photoconductor or the intermediate medium, the contrast between the reflectance of the toner portion and that of the non-toner portion with an image area factor being 50% is not less than 0.5. With this condition, the highlight area is reproduced by pixels with gathered toner and the end portion of each pixel in the medium density portion becomes sharp. The contrast between the reflectance of the toner portion and that of the non-toner portion is measured by means of a fine density measuring instrument, which requires to have a resolution of approximately several μm in order to correspond to toner images exceeding 150 screen lines/inch or greater. For example, the toner image is taken in at a suitable magnification with a CCD having sufficient resolution and the aforementioned reflectance contrast is obtained by means of an image analyzer.

With the aforementioned image forming conditions together with the application of the simultaneous transfer-fixing system, further examinations proved that though an image of high quality was obtainable by suppressing image deterioration appearing to originate from toner image turbulence, defective transfer-fixation and toner-to-toner Coulomb's repulsion force in the high density and highlight portions, the dot and lines/inch structure of a so-called on-off binary, digitized toner image tended to become non-uniform in the medium density area; in other words, the image deterioration had not been remedied yet or otherwise had been worsened in comparison with the normally practiced electrostatic transfer system. This was not definitely confirmed in the image forming conditions under which pixels with gathered toner could hardly be formed in the highlight area.

In seeking for the image deterioration phenomenon in the medium density area, the toner image on the recording medium had the intended digitized image structure and formed pixels with gathered toner in the highlight area but appeared out of shape considerably from the intended image structure in some of the medium density area. This pitch ranges roughly from 0.3 mm to 2 mm and recognized to be image irregularities. However, almost no irregularities were observed in the high density area and a high quality image excellent in color balance and glossiness was obtained therein.

When the reason for the collapse of the toner image in the medium density area was sought, it was also found out that in the case of an image forming apparatus in the simultaneous transfer-fixing system, the aforementioned toner image was not seen to collapse when the recording medium was peeled off the intermediate medium immediately after the intermediate medium and the recording medium were bonded together and heated. On the other hand, as disclosed in the Unexamined Japanese Patent Application Publications Nos. Hei 5-19642, Hei 5-107950 and Hei 5-249798, toner images were found to become non-uniform when a recording medium was peeled off an intermediate medium after both the intermediate and recording medium were bonded together and heated and then cooled. The reason for this is considered attributable to the fact that during the process of bonding the intermediate and recording medium together, heating and then cooling them, the original toner image structure, that is, the toner image structure on the intermediate medium collapses and until the heat-melted toner is cooled and set, it unevenly flows through a very small gap between the intermediate and recording medium and consequently causes the toner image to become non-uniform (see FIGS. 9A and 9B).

When the recording medium is peeled off the intermediate medium immediately after the intermediate and recording medium were bonded together and heated, no irregularities were seen in the medium density area. However, a so-called offset phenomenon causing the efficiency of transferring and fixing toner to the recording medium to be worsen and local irregularities in image glossiness were seen; this is, the color image was not satisfactory.

In order to obtain a medium contrast image of high quality using the simultaneous transfer-fixing system for the image forming apparatus for dealing with an image as a digital signal so as to form the image through the area modulation method using the dot and lines/inch arrangement, it is important that the toner image holds the dot and lines/inch structure even in the medium density area. During the process of bonding the intermediate and recording medium together, heating and cooling both, the heat-melted toner should be prevented from irregularly flowing until the heat-melted toner is cooled and set.

SUMMARY OF THE INVENTION

In view of the foregoing problems, an object of the present invention is to provide an image forming apparatus in a simultaneous transfer-fixing system for simultaneously transferring and fixing a toner image to a recording medium while dealing with an image as a digital signal, the toner image formed on a toner-image holding unit being of dot and lines/inch structure, and particularly for preventing the turbulence of the image structure in a medium density portion.

In order to accomplish the object above, an image forming apparatus as a first embodiment of the invention comprises a toner-image holding unit for holding a toner image and conveying the toner image from a predetermined toner-image forming position to a predetermined toner-image transfer position, toner-image forming means for forming the toner image provided with a predetermined number of lines per length on the toner-image holding unit in the toner-image forming position, and transfer-fixing means for transferring and fixing the toner image onto a predetermined recording medium, the toner image being conveyed by the toner-image holding unit to the toner-image transfer position, while heating an object to be heated with a heating source in contact with at least one of the toner-image holding unit and the recording medium as such an object, and is characterized in that given that the predetermined number of lines per length corresponding to the toner image formed by the toner-image forming means is defined by d (lines/inch) and that the viscosity of molten toner is defined by $\eta$ (Pa.s), the toner-image forming means forms the toner image by the use of toner always satisfying $$\eta \geq 0.040 \, d^2 \quad (1)$$

until the toner image on the toner-image holding unit is heat-melted and transferred onto the recording medium before being cooled.

The toner-image forming means in the image forming apparatus as the first embodiment of the invention preferably forms the toner image by the use of toner, in place of toner satisfying $\eta \geq 0.040 \, d^2$, always satisfying $$\eta \geq 0.055 \, d^2, \quad (2)$$

until the toner image on the toner-image holding unit is heat-melted and transferred onto the recording medium before being cooled.

In order to accomplish the object above, an image forming apparatus as a second embodiment of the invention comprises a toner-image holding unit for holding a toner image and conveying the toner image from a predetermined toner-image forming position to a predetermined toner-image transfer position, toner-image forming means for forming the toner image provided with a predetermined number of lines per length on the toner-image holding unit in the toner-image forming position, and transfer-fixing means for transferring and fixing the toner image onto a predetermined recording medium, the toner image being conveyed by the toner-image holding unit to the toner-image transfer position, while heating an object to be heated with a heating source in contact with at least one of the toner-image holding unit and the recording medium as such an object, and is characterized in that given that the predetermined number of lines per length corresponding to the toner image formed by the toner-image forming means is defined by d (lines/inch) and that the viscosity of molten toner is defined by $\eta$ (Pa.s), cooling means is provided for cooling the toner image transferred by the transfer-fixing means onto the recording medium within 50 ms at latest after the object to be heated is separated from the heating source up to a state satisfying $$\eta \geq 0.040 \, d^2 \quad (1)$$

In the image forming apparatus as the second embodiment of the invention, cooling means, in place of the aforesaid cooling means, is preferably provided for cooling the toner image transferred by the transfer-fixing means onto the recording medium within 50 ms at latest after the object to be heated is separated from the heating source up to a state satisfying $$\eta \geq 0.055 \, d^2 \quad (2)$$

The cooling means in the image forming apparatus as the second embodiment of the invention may be provided with a cooling member having a cooling portion which is brought into contact with and used for cooling an object to be cooled which is at least one of the toner-image holding unit and the recording medium in a position where the object to be heated passes therein within 50 ms after a point of time the object to be heated is separated from the heating source, and a radiating portion for radiating the heat taken from the object to be cooled. The cooling member is placed so that its radiating portion is brought into contact with the toner-image holding unit which is being moved from the toner-image forming position toward the toner-image transfer position.

The cooling means in the image forming apparatus as the second embodiment of the invention may be provided with a cyclic moving member which is situated in a position where the object to be heated passes within 50 ms after the point of time the object to be heated is separated from the heating source and moved via a cooling position in contact with the object to be cooled which is one of the toner-image holding unit and the recording medium and via a radiating position where the heat taken from the object to be cooled is radiated. Even in this case, the cyclic moving member may cyclically be moved via the cooling position in contact with the object to be cooled where the object to be heated passes within 50 ms after the point of time the object to be heated is separated from the heating source and via the radiating position in contact with the toner-image holding unit which is being moved from the toner-image forming position toward the toner-image transfer position.

The cooling means in the image forming apparatus as the second embodiment of the invention may be provided with an air-cooling unit for sending air to the object to be cooled which is at least one of the toner-image holding unit and the recording medium in the position where the object to be heated passes within 50 ms after the point of time the object to be heated is separated from the heating source.

The image forming apparatus according to the present invention is preferably arranged so that it meets the following requirements; namely, with respect to toner, in addition to satisfying the aforementioned Eq. (1) or (2), powder toner for use preferably has a viscosity of $1 \times 10^4$ Pa.s or less at a melting temperature of Tm. With respect to the image forming conditions, moreover, given the reflectance contrast between the toner sticking portion (toner portion) and the toner non-sticking portion (non-toner portion) of the toner image is set to 1.0 in an area where an input image area factor is 100%, it is preferred to form a toner image with pixel-to-pixel gathered toner so that the reflectance contrast between the toner portion and the non-toner portion on the toner-image holding unit is 0.5 or greater in an area where an input image area factor is 50%.

In the case of a printer or a copying machine, for example, digital electrophotography has widely been used as what is capable of offering good-quality images at high speed. In such electrophotography, a light beam regulated by a focusing optical system to provide it with a spot diameter of predetermined size is used for photoscanning the surface of a photoconductor, so that an electrostatic latent image corresponding to the image signal determined by a pulse width modulating means is formed on the photoconductor by turning on and off the light beam. The electrostatic latent image is formed into an image by the use of toner. According to the present invention, the process of forming such a toner image is not limited to the electrophotography but may be such that a toner image is formed on the toner-image holding unit by directly letting toner jump thereto according to digitally processed image data or a magnetic latent image is formed on a predetermined toner-image holding unit according to digitally processed image data, which is followed by the step of forming a toner image on the toner-image holding unit on the basis of the magnetic latent image or otherwise a charged image is directly made to a predetermined toner-image holding unit according to digitally processed image data and then a toner image is formed on the toner-image holding unit on the basis of the electrostatic latent image.

According to the present invention, the toner image on the toner-image holding unit is preferably formed with the image forming conditions under which given the reflectance contrast between the toner portion and the non-toner portion is set to 1.0 in an area where an image area factor is 100%, the reflectance contrast between the toner portion and the non-toner portion is 0.5 or greater in an area where an image area factor is 50%. In this case, pixels with gathered toner are formed even in the highlight area and the toner of each pixel is free from scattering even in the medium density area, whereby a distinct image is produced.

The distinct toner image thus formed may primarily be transferred onto an intermediate transfer unit once, then transferred and fixed to the recording medium. In this case, the intermediate transfer unit is equivalent to the toner-image holding unit according to the present invention.

A description will subsequently be given of a system of transferring and fixing a toner image onto a recording medium after electrostatically transferring the toner image onto such an intermediate transfer unit in electrophotography.

Unlike paper, the intermediate transfer unit is hardly affected by the environment (temperature and moisture) and formable with physically stable material in view of surface properties and resistivity. Therefore, the photoconductor and the intermediate transfer unit can be joined tightly for electrostatic transferring purposes and consequently the toner image is almost free from turbulence or irregularities due to the turbulence of the transfer electric field described above on condition that proper physical values are given. Important factors which the intermediate transfer unit requires at the time of electrostatic transfer are surface resistivity Rs ($\Omega\square$) and volume resistivity Rv ($\Omega$.cm); the Rs is preferably in the range of $10^8 < Rs < 10^{16}$, and Rv preferably in the range of $10^7 < Rv < 10^{15}$, If the Rs, Rv are lower than the range, the charge will spread and if they are higher, the charge will be stored too much.

The toner image electrostatically transferred onto the intermediate transfer unit is formed of dots and lines/inch as pixels with gathered toner, and the acquisition of image density is based on its area factor. This toner image is transferred and fixed on the recording medium in a transfer-fixing unit.

In the transfer-fixing unit, the intermediate transfer unit, the toner image and paper as the recording medium are tightly joined and heated. Then powder toner is melted and fused into one sheet of film. At this time, it is needed to tightly join the intermediate transfer unit and paper for the efficient heat transfer to the toner image and if air is introduced during this process, the toner image is not uniformly melted because the heat capacity varies, depending on the presence or absence of air. Consequently, image quality deteriorates as transfer-fixing irregularities and a so-called offset phenomenon are caused. In order to properly and tightly join the intermediate transfer unit and paper with the toner image held therebetween, an elastic layer is usually provided on the surface of the intermediate transfer unit and it is preferably 10–70 in rubber hardness and 30 $\mu$m–300 $\mu$m thickness. The transfer-fixing unit normally comprises a heating roll containing a heat source such as a halogen lamp and a press roll which is set opposite to the heating roll and used for press-holding the intermediate transfer unit, the toner image and paper with a nip pressure preferably ranging $1 \times 10^5$ Pa–$1 \times 10^6$ Pa. If the pressure is lower than the range, the intermediate transfer unit, the toner image and paper will insufficiently tightly be joined together and the aforementioned nonconformity will be caused and if the pressure is higher than the range, too strong stress will be applied to the intermediate transfer unit and paper, thus causing troubles including wrinkles, making a mechanism and an arrangement for supporting high pressure complicate. In place of the heating roll, use may be made of an electroconductive heater installed on a heat resistant support and a fixed heating member whose surface is covered with a heat resistant, wear resistant layer.

A area where the toner-image holding unit (the intermediate transfer unit in this case) or the recording medium (paper in this case) contacts the heating roll or the fixed heating member is called a toner-image heating area.

In the intermediate transfer unit of the conventional image forming apparatus in the simultaneous transfer-fixing system, as disclosed in the aforementioned Unexamined Japanese Patent Application Publications Nos. Hei 5-19642, Hei 5-107950 and Hei 5-249798, the intermediate transfer unit and paper are tightly joined and heated (see FIG. 10) and both are cooled. When the paper is then peeled off the intermediate transfer unit, the turbulence of the toner image occurs and irregularities of the image due to the collapse of the image structure appears (see FIG. 11). When the paper is peeled off the intermediate transfer unit immediately after the intermediate transfer unit and the paper are tightly joined and heated, the toner image is set free from any collapse (see FIG. 12). The heating of the toner image is started at the entrance of the heating area and its temperature is raised and then the toner image is heated up to at least a molten condition by the time it passes through the heating area. When the paper is peeled off the intermediate transfer unit immediately after the joining and heating operation, the toner in the molten condition lies between the intermediate transfer unit and the paper for only a short time and it hardly flows through a very small gap between the intermediate transfer unit and the paper, thus making difficult the occurrence of toner image turbulence, it seems. A transparent film instead of paper and a transparent press roll were used to observe the state in which the paper and the intermediate transfer unit were tightly joined under pressure. Then it was confirmed that while the paper and the intermediate transfer unit were uniformly kept joined together under the nip pressure, the paper and the intermediate transfer unit tended to become loosely joined when the pressure is released and the paper was found afloat in places. As the result of observing this phenomenon with a video camera, it was also confirmed that there appeared local gaps between the paper and the intermediate transfer unit for as short as 50 ms after the pressure was released. In other words, such a small gap tends to appear between the intermediate transfer unit and the paper, and the turbulence of the toner image of the dot and lines/inch structure is considered attributable to the flow of the molten toner through the gap with capillary force.

The turbulence of the toner image of the dot and lines/inch structure which is considered attributable to the flow of the molten toner through the gap between the intermediate transfer unit and the paper with capillary force varies with the quantity of toner moving through the very small gap. The quantity of molten toner moving through the very small gap is generally determined by the size r of a gap, the viscosity $\eta$ of toner in the gap, the surface tension of an intermediate transfer unit as an image holding unit that the toner contacts, the surface tension of paper as a recording medium and the surface tension of the toner. Of these factors, the viscosity η of the toner varies by one digit in the melting (Tm) temperature range Tm−10° C. which is considered existent in the heating area. On the other hand, the surface tension of an intermediate transfer unit as an image holding unit ranges from 25 to 30 dyn/cm even though it is made of good parting material; the surface tension of paper as a recording medium ranges from 35–40 dyn/cm; and the surface tension of toner approximately ranges from 30–35 dyn/cm in the molten (Tm) temperature range from Tm−10° C. Any one of the factors varies less.

In other words, the quantity h of molten toner moving in the very small gap is greatly dependent on the viscosity η of toner and this can generally be expressed by Eq. (3) from the formula of Lucas Washburn explanatory of the fact that a movement in a liquid capillary is inversely proportional to the square root of liquid viscosity.

$$h \propto k/\sqrt{\eta} \qquad (3)$$

where k=value determined by the size r of a gap, the surface tension of an image holding unit, the surface tension of a recording medium, the surface tension of toner and a contact angle.

Generally, the viscosity at the melting temperature Tm of heat-fixed toner is $1\times10^4$ Pa.s or lower. The melting temperature Tm of toner having higher viscosity is about 200° C. or higher and this makes it necessary to raise the set temperature of a heater, which is unpractical because the heating source or the heater quickly deteriorates.

Although the quantity of toner moving in the very small gap is roughly determined by toner viscosity, the relation between this quantity and image turbulence varies with the pixel-to-pixel pitch of the toner image. In other words, if the pixel-to-pixel pitch is great with the quantity of toner moving in the very small gap being the same, the movement of toner with respect to the pixel is relatively small and it is not recognized as image turbulence. If, however, the pixel-to-pixel pitch is small, the movement of toner with respect to the pixel is relatively large and it is readily recognizable as image turbulence. In other words, the number of lines forming an image on the screen grows larger, the movement of toner has to be kept small and to this end, toner viscosity in the very small gap needs increasing.

FIG. 13 shows toner viscosity with respect to temperatures, wherein toner A, toner B and toner C are polyester toner. Toner A has a weight-average molecular weight (Mw) of 13,000, a melting temperature (Tm) at 110° C. and a viscosity (η) of 1,500 Pa.s at the melting temperature; toner B has a weight-average molecular weight (Mw) of 54,000, a melting temperature (Tm) at 120° C. and a viscosity (η) of 4,000 Pa.s at the melting temperature; and toner C has a weight-average molecular weight (Mw) of 78,600, a melting temperature (Tm) at 140° C. and a viscosity (η) of 10,000 Pa.s at the melting temperature. The toner viscosity shown in FIG. 13 indicates the values measured by the use of a flow tester CFT500C of Shimazu Corporation under the following conditions: starting temperatures at 80° C.—highest temperature at 170° C.; heating rate at 3° C./min; preheating time at 300 sec; cylinder pressure at 10 kgf/cm², and die dimensions 1.0 mm×1.0 mm.

The toner melting temperature (Tm) is defined as follows: 'Plunger—drop quantity—temperature curve' of toner drawn when toner is heated at an equal rate using the flow tester under the above conditions is obtained. Accurately weighed 1–3 g of Fine powder is used as sample toner with the sectional area of the plunger being 10 cm². FIG. 14 shows the plunger—drop quantity—temperature curve. As the toner is heated at the equal rate, it is gradually heated and starts flowing out. When the toner is heated further and becomes melted, it considerably flows out and then the plunger drop stops and terminates. The final plunger drop quantity D of FIG. 14 represents the total outflow quantity of toner and the temperature Tm corresponding to D/2 is defined as the melting temperature of the toner.

In the heating portion of the intermediate transfer unit and paper that have been joined together, toner is heated to a temperature higher than the melting temperature and the individual toner is fused into one sheet of film. In this case, toner A, toner B and toner C were transferred and fixed at heating temperatures of 110° C., 120° C. and 140° C., respectively. The heating temperatures mean those monitored as toner temperature by inserting a thermocouple in between the intermediate transfer unit and paper. Therefore, the toner viscosity of the tightly joined heating portions is $1.5\times10^3$ Pa.s for toner A, $4\times10^3$ Pa.s for toner B and $1\times10^4$ Pa.s for toner C. The toner together with the intermediate transfer unit and the paper that are moved out of the heating portion comes into contact with air outside and consequently it temperature lowers. With respect to the aforementioned toner heating temperature, the temperature by natural radiation cooling remains almost unchanged for as short as 50 ms; namely about 5° C. drop. This heating and temperature variations for a short time after pressure nipping do not result from measurement but are calculated from the heat exchange relation between a high temperature body including the intermediate transfer unit and the air according to the following Eq. (4).

$$T(t)=Tf+(TO-Tf)\cdot\mathrm{Exp}\{-h\cdot t/(c\cdot\rho\cdot b/2)\} \qquad (4)$$

where Tf=the air temperature (30° C.), TO=initial temperature of the high temperature bodies (toner A:110° C., toner B:120° C. and toner C:140° C.), h=heat transfer coefficient (15 J/m²·s·°C. in the case of natural radiation cooling), t=time, c=specific heat ($1.3\times10^3$), ρ=density ($1.5\times10^3$) and b=thickness ($125\times10^{-6}$m). In the parentheses are values resulting from the materials used for the testing above for calculating purposes. Although high-speed response measurement of 1s is or less is difficult in temperature variations, measurement roughly every 1s is possible and the heat transfer coefficients h were obtained from the measured results of the temperature variation.

As set forth above, though the toner temperature remains almost unchanged for as short as 50 ms in the natural radiation cooling after the heating area, the temperature of the combination of the intermediate transfer unit, the toner image and the paper discharged at a heating area exit can be lowered by 4° C.–8° C. when it is exposed to cooling air, which results from temperature calculations 50 ms after passage through the heating area using Eq. (4) for obtaining the heat transfer coefficient h by testing when cooling conditions are varied. The toner viscosity increases as the toner temperature lowers.

FIG. 15 shows the results of evaluation of image irregularities obtained by raising the toner temperature up to the toner melting temperature in the heating area, varying the toner viscosity η (Pa.s) immediately after passage through the heating area (50 ms after) while varying the cooling conditions at the exit of the heating area using three kinds of toner and effecting image outputting onto surface paper (coat paper J: measured value of 10 points mean roughness SRz by means of a contact three-dimensional surface roughness meter is 5 μm). Incidentally, lines/inch (vertical lines/inch in this case) at the same angle with toner of all colors were used for the screen, and five kinds in the number of lines d were used; namely, 150 lines/inch, 200 lines/inch, 300 lines/inch, 400 lines/inch and 600 lines/inch. The image irregularities were visually evaluated over the whole area of image area factors 5% –100%: X represents a case where the image irregularities were obviously recognized; ○ where the image irregularities were perceived slightly though not so conspicuous as output images; and ⊙ where no image irregularities were perceived.

From the results above, it is found necessary to set viscosity higher than what is determined by lines/inch d in order to obtain image irregularities at an allowable level with respect to the lines/inch d.

FIG. 16 shows a graph resulting from plotting the square roots of minimum viscosity to obtain image irregularities at such an allowable level with respect to the lines/inch d. As shown in FIG. 16, there is the linear relation between the square roots of minimum viscosity for obtaining image irregularities at the allowable level with respect to the lines/inch d and when the method of least squares is used to obtain a recurrent equation, the ○ level indicating the presence of slight image irregularities which are not distinct as an image is given by $$\sqrt{\eta} = 0.201 \times d$$

and when the root sign is opened, the result becomes $$\eta = 0.040 \cdot d^2.$$

At the level ⊙ indicating no image irregularities are recognized, $$\sqrt{\eta} = 0.235 \times d$$

and when the root sign is opened, the result becomes $$\eta = 0.055 \cdot d^2.$$

From the description above, the relation between lines/inch d and viscosity for obtaining a good image without causing image irregularities is given by $$\eta = 0.040 \cdot d^2 \quad (1)$$

Further, the relation between lines/inch d and viscosity for obtaining a good image without image irregularities to be perceived is given by $$\eta = 0.055 \cdot d^2 \quad (2)$$

When an image having certain lines/inch d is formed, cooling immediately after passage through the heating area can be dispensed by using toner whose viscosity at the melting temperature is 0.040 $d^2$ or higher and preferably 0.055 $d^2$. A method of increasing toner viscosity at the melting temperature includes increasing the weight-average molecular weight (Mw) and molecular weight distribution (Mw/Mn: Mn=number mean molecular weight), for example, using resin having a plurality of peaks on high and low molecular weight sides and partially crosslinked resin.

The method of positively lowering the temperature at a pressure nipping exit after heating is not limited to air-cooling by means of cooling air includes making a low temperature member contact an intermediate transfer unit or paper and moving the heat from the high temperature portion to the low temperature portion with the same effect obtained as described above. In this case, the effect is continuously achievable through the steps of cyclically moving a belt-like contact member, making part of the periphery of the belt contact an intermediate transfer unit or paper at the pressure nipping exit after heating, and cooling the belt in a different place. In this case, heat exchange with another low temperature member may be employed in a place different from the contact portion with the intermediate transfer unit or paper at the pressure nipping exit after heating; for example, the belt may be made to contact the low temperature intermediate transfer unit before the heating area.

Moreover, a heat exchanger such as a heat pipe may be used as a cooling unit at the heating area exit and thermally moved.

The aforementioned cooling means at the pressure nipping exit after heating may be effective even though it is provided on one side of the heater or press member or on both sides. However, the provision of such a cooling means on the relatively low temperature press member side prevents a rise in the temperature of the cooling member and besides transfer-fixation can efficiently be carried out thermally because the loss of heat of the heater is minimized.

While the undersurface of the toner image carrying side of the intermediate transfer unit is brought into contact with the heater before pressure nipping after heating, the toner image may be conveyed to the pressure nipping portion, whereby the intermediate transfer unit and the toner are more uniformly heatable without any difference in temperature between the surface and the undersurface. Accordingly, the toner heating temperature within the nip can be set lower and the toner is prevented from flowing as the toner viscosity rises at the nip exit, so that image turbulence is suppressed.

As in a general fixing unit, heating and rapid heating in only the pressure nipping portion result in raising the temperature of a portion close to the heater in the thickness direction of the toner layer and keeping a portion separated from the heater relative low in the temperature distribution. When the difference in temperature in the thickness direction of the toner layer increases, the low temperature portion has to be kept at least at the toner melding temperature for transferring and fixing purposes. Consequently, the temperature of the high temperature portion becomes higher by the temperature difference than the toner melting temperature, whereby the toner viscosity is lowered. In other words, some portions of the toner layer tend to become low in viscosity and allow the toner to readily flow, thus causing image turbulence. The image turbulence easily occurs in the simultaneous transfer-fixing system for heating, transferring and fixing toner image and paper while holding them between the fixed heating member covered with the wear resistant layer and the press roll. Since a linear electroconductive heater generates heat instantly after being supplied with power and is capable of heating the intermediate transfer unit, the toner image and the paper, waiting time at the time of rising is shorter than the heating roll system and so-called instant ON is possible. Although heating is possible in a short time, difference in temperature among the intermediate transfer unit, toner image and paper layers in the thickness direction tends to occur to the extent that such waiting time is shorter with the short-time heating. In other words, the temperature of toner closer to the heater is considerably higher than its melting temperature, whereas the temperature of what is away from the heater is roughly equal to the melting temperature as the lowest temperature at which the toner can be transferred and fixed. Thus, the toner situated close to the heater tends to easily flow since it is low in viscosity, thus readily causing image turbulence.

In the simultaneous transfer-fixing system for heating the intermediate transfer unit, the toner image and paper with the linear electroconductive heater, a plurality of linear electroconductive heating members are installed and the undersurface of the toner carrying surface of the intermediate transfer unit is made to contact and slide on the fixed heater before the nip between the heating members and the press roll. Further, the plurality of linear electroconductive heaters arranged in a portion before the nip are used to preheat the intermediate transfer unit and the toner image to obviate the temperature difference in the thickness direction and the toner image is conveyed to the pressure nip. Thus, the temperature difference is reduced in at least the toner layer thickness and the toner heating temperature can be set low, whereby the toner viscosity increases and makes the toner hardly flow, thus preventing image turbulence. In this case, the means of heating the intermediate transfer unit and the toner image before the nip may be a heating lamp or a heating roll containing a heat source separately provided other than the fixed heating member.

As described above in detail, the simultaneous transfer-fixing operation is performable without toner image turbulence and the collapse of the dot and lines/inch image structure by regulating toner viscosity as an index of toner flow after passage through the heating area.

DETAILED DESCRIPTION OF THE PREFERRED EMBODIMENTS (Embodiment 1)

Figure 17:
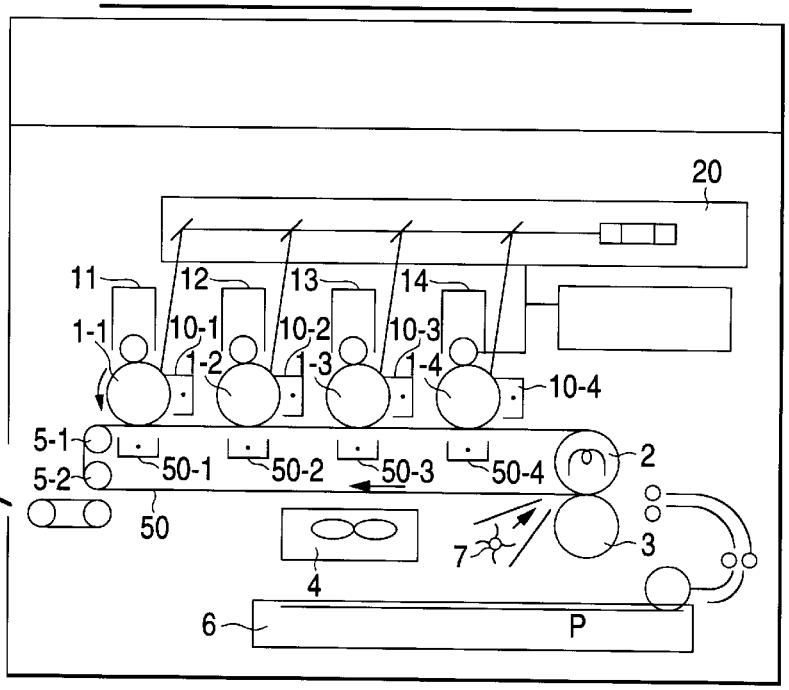
FIG. 17 is a block diagram illustrating an image forming apparatus as a first embodiment of the invention.

FIG. 17 is a block diagram illustrating an image forming apparatus as a first embodiment of the invention.

In FIG. 17, an intermediate transfer unit 50 is in the form of an endless belt and supported with rollers 5-1, 5-2 and a heating roll 2, whereby it is rotatably moved in the direction of an arrow. A press roll 3 is placed opposite to the heating roll 2. The positions of the heating roll 2 and the press roll 3 may be inverted and the press roll 3 may also be a heating roll having a heat source inside. There are four photoconductors 1-1, 1-2, 1-3, 1-4 arranged on the periphery of the intermediate transfer unit 50 and uniformly charged by respective chargers 10-1, 10-2, 10-3, 10-4 before being scanned and exposed by an exposure unit 20 to a light beam which is turned on or off in response to an image signal, so that electrostatic latent images are formed. The electrostatic latent images formed on the photoconductors 1-1, 1-2, 1-3, 1-4 are respectively developed by developing devices 11, 12, 13, 14 each containing black, yellow, magenta and cyan color toner into toner images of above colors as digital images indicating density by area modulation, these images being each formed on the photoconductors 1-1, 1-2, 1-3, 1-4.

These toner images of the respective colors above are successively transferred by transfer devices 50-1, 50-2, 50-3, 50-4 onto the intermediate transfer unit 50, so that a toner image with a plurality of colors successively superposed is formed on the intermediate transfer unit 50.

The press roll 3 is placed so as to be detachable from the heating roll 2 and brought into contact with the heating roll 2 in synchronization with the feeding of recording paper P from a tray 6. Then the intermediate transfer unit 50 holding the toner image of different colors and the recording paper P are moved between the heating roll 2 and the press roll 3 at proper timing and heated under pressure. The toner heated at temperatures higher than its melting temperature is softened, melted and permeated through the recording paper P before being set up, whereby transfer-fixing is carried out. A cooling unit 4 is used for cooling the combination of the intermediate transfer unit 50 and the recording paper P integrally conveyed from a heating area, so that strong adhesion to the recording paper P is produced as the toner is cohesively set up. The intermediate transfer unit 50 and the recording paper P thus cooled by the cooling unit 4 are conveyed further and the recording paper P is separated from the intermediate transfer unit 50 at the roller 5-2 having a small curvature radius because of the nerve (stiffness) of the recording paper P itself. Thus, a color image is formed on the recording paper P. The surface of the toner image transferred and fixed to the recording paper P follows the surface of the intermediate transfer unit 50 and becomes smoothed and glossy.

For the photoconductors 1-1, 1-2, 1-3, 1-4, use can be made of various inorganic photosensitive materials (Se, a-Si, a-SiC, CdS, etc) and also various organic photosensitive materials.

Figure 1:
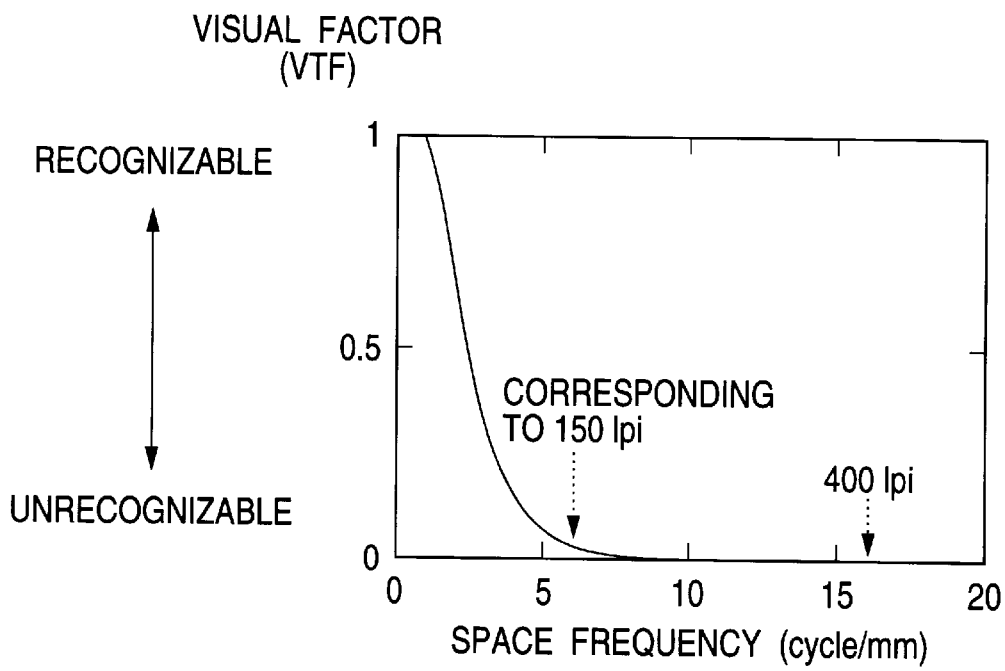
FIG. 1 is a graph showing visual factors indicative of the degree of recognition of human visual sensation with respect to space frequency.
Figure 2:
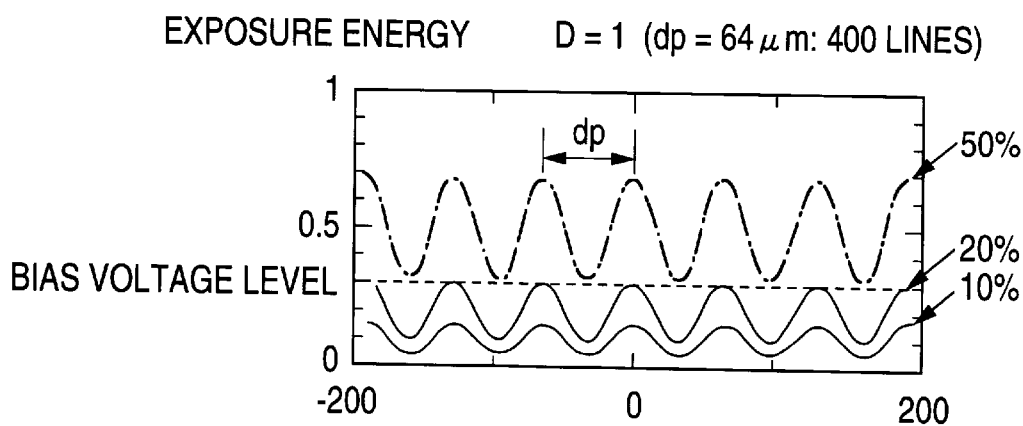
FIG. 2 is a diagram showing an exposure energy profiled on a photoconductor when a pulse width modulating means is used for exposing the photoconductor.
Figure 3:
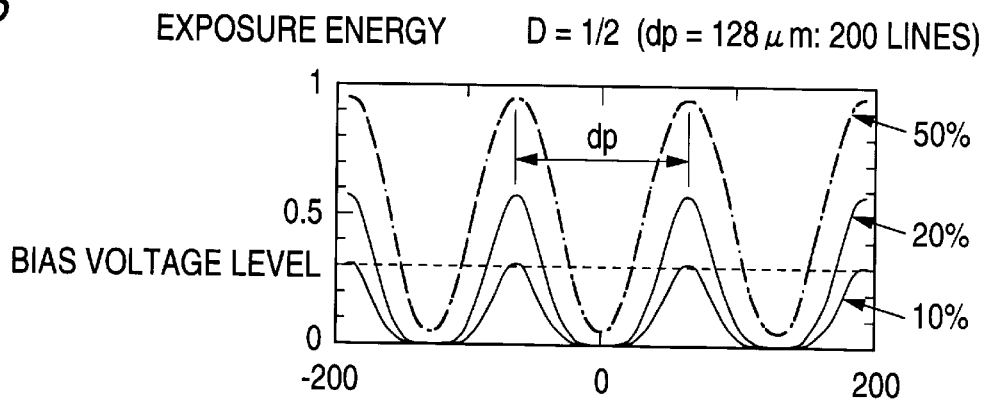
FIG. 3 is a diagram showing an exposure energy profiled on a photoconductor when a pulse width modulating means is used for exposing the photoconductor.
Figure 4:
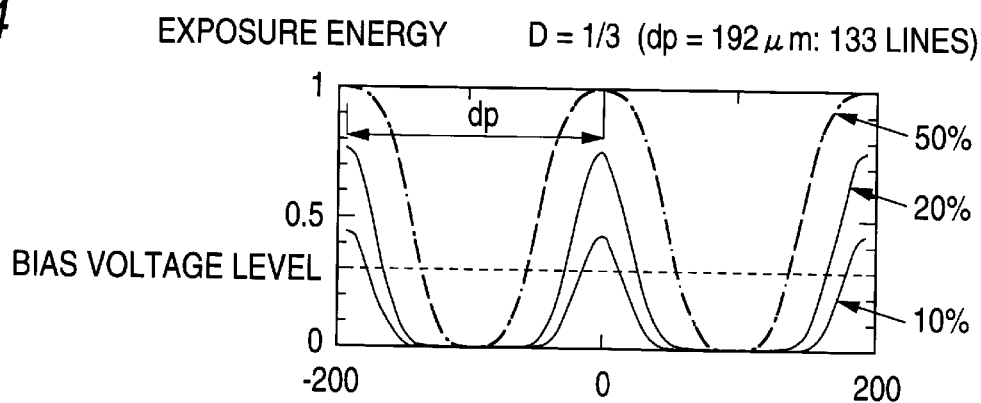
FIG. 4 is a diagram showing an exposure energy profiled on a photoconductor when a pulse width modulating means is used for exposing the photoconductor.
Figure 5:
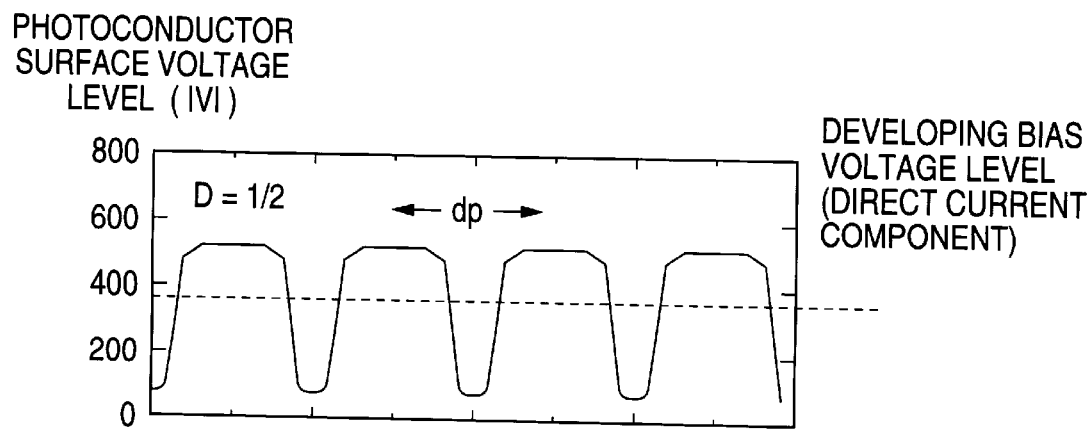
FIG. 5 is a diagram showing simulated results of an electrostatic latent image in a highlight area formed on a photoconductor when the photoconductor having photopotential attenuation characteristics of FIG. 7.
Figure 6:
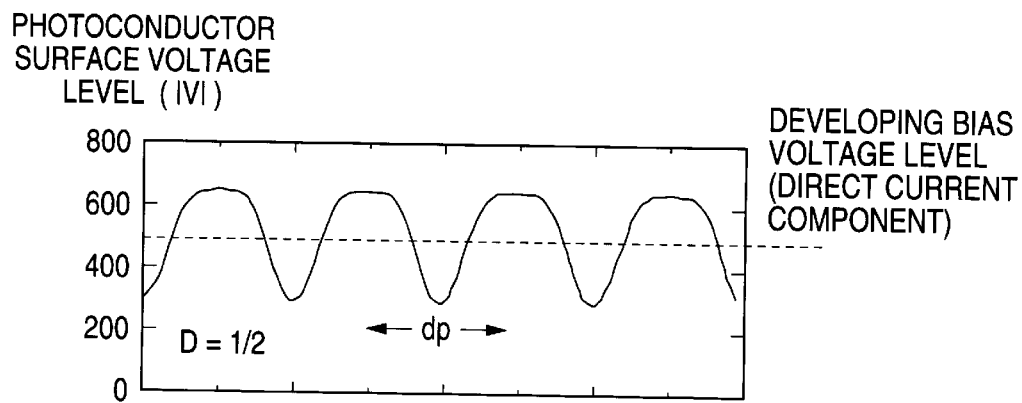
FIG. 6 is a diagram showing simulated results of an electrostatic latent image in a highlight area formed on a photoconductor when the photoconductor having photopotential attenuation characteristics of FIG. 8.
Figure 7:
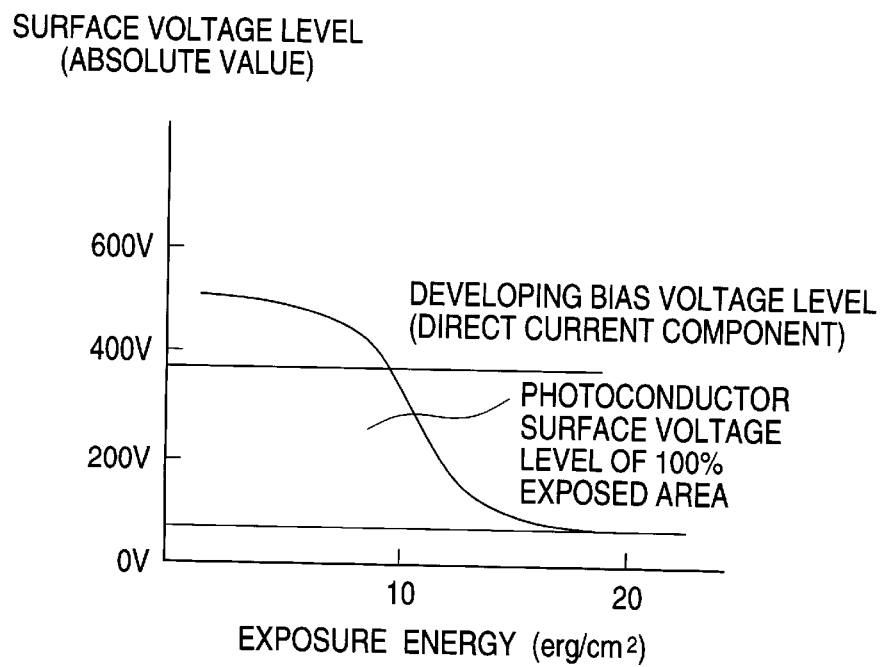
FIG. 7 is a graph showing an example of the photopotential attenuation characteristics of the photoconductor.
Figure 8:
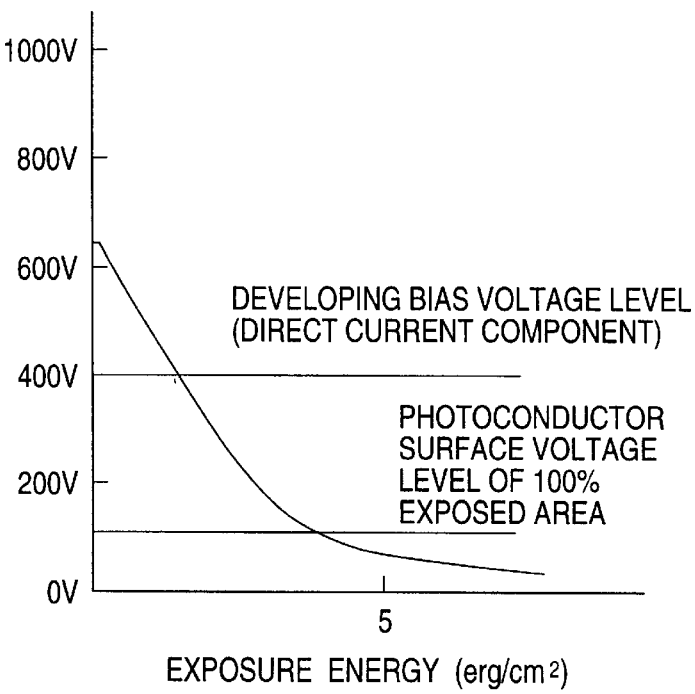
FIG. 8 is a graph showing an example of the photopotential attenuation characteristics of the photoconductor.
Figure 9A:
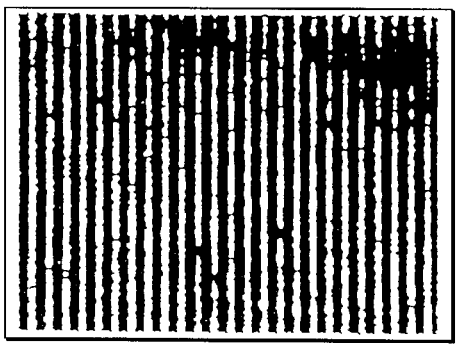
FIGS. 9A and 9B are diagrams showing difference in image turbulence due to difference in timing at which paper is peeled off after a toner image is transferred and fixed.
Figure 9B:
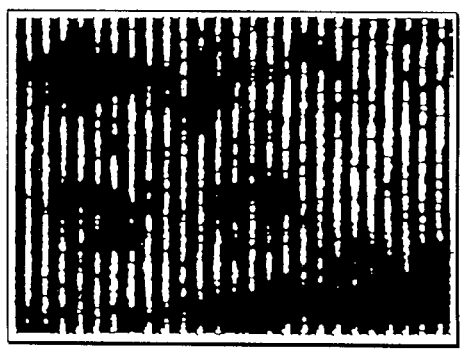
Figure 10:
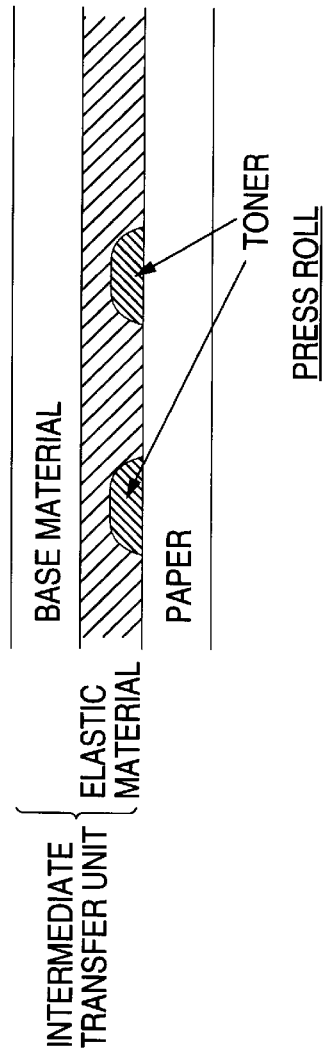
FIG. 10 is an exemplary diagram showing a state in which an intermediate transfer unit and paper have been joined tightly and heated.
Figure 11:
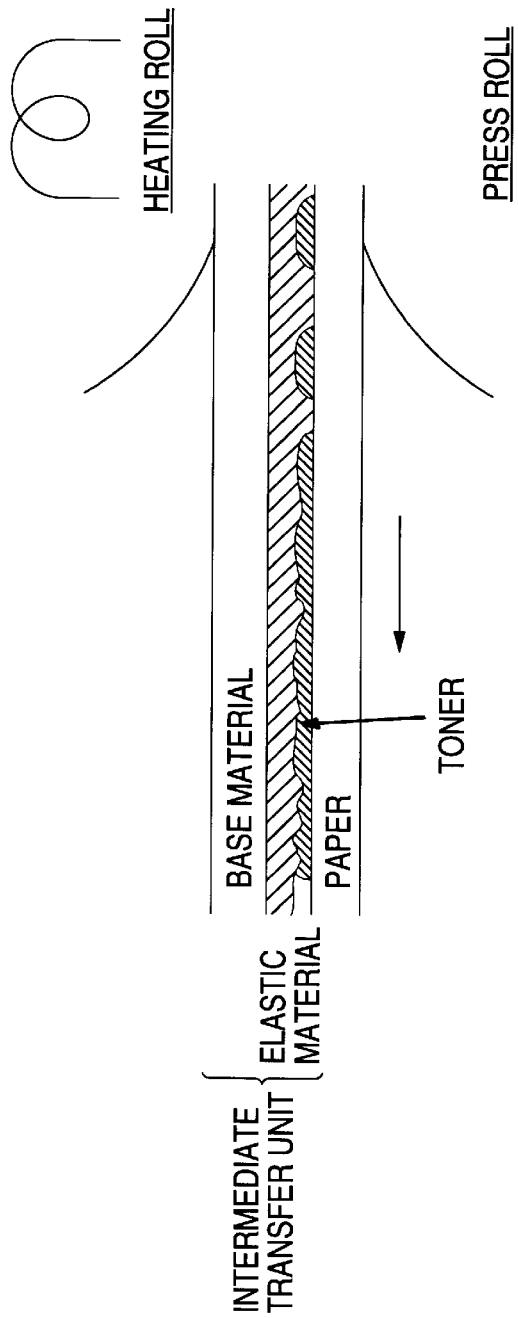
FIG. 11 is an exemplary diagram showing a state in which an intermediate transfer unit and paper are kept in contact with each other after the intermediate transfer unit and paper have been joined tightly and heated.
Figure 12:
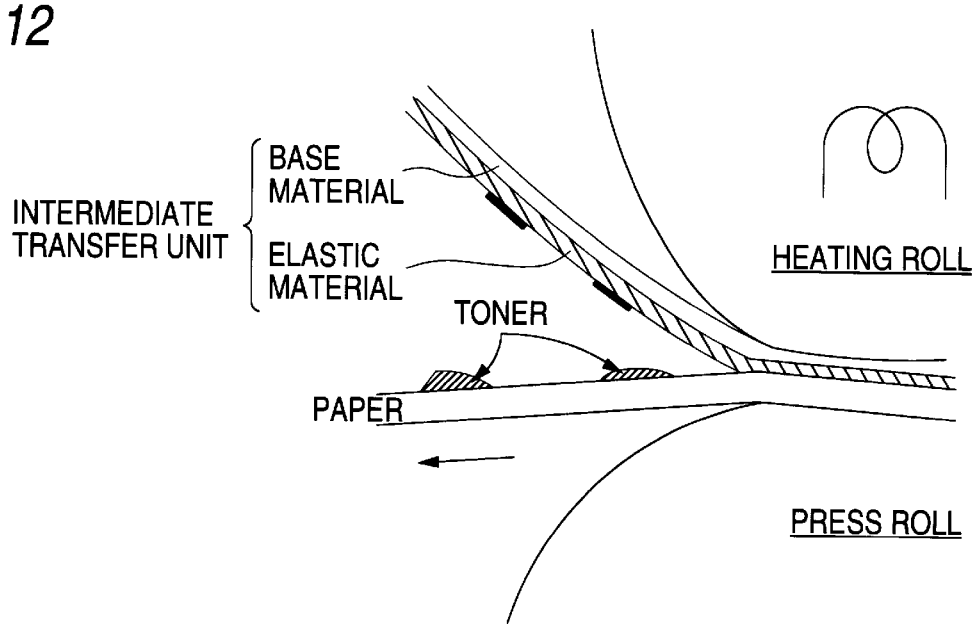
FIG. 12 is an exemplary diagram showing a state in which an intermediate transfer unit and paper are immediately separated after the intermediate transfer unit and paper have been joined tightly and heated.
Figure 13:
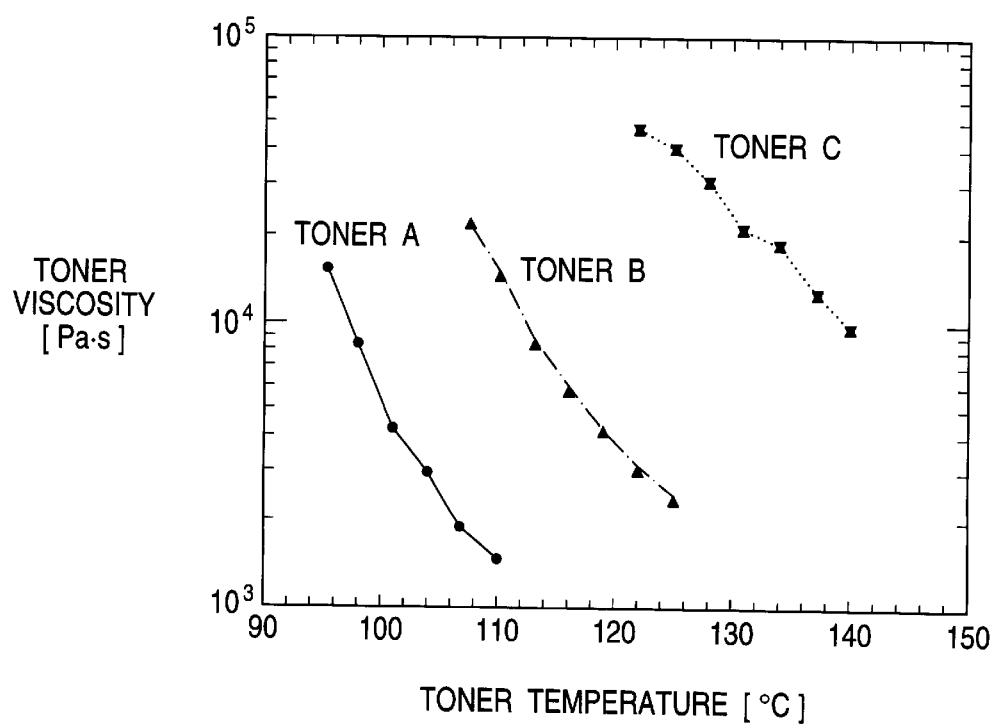
FIG. 13 is a diagram showing toner viscosity with respect to toner temperature.
Figure 14:
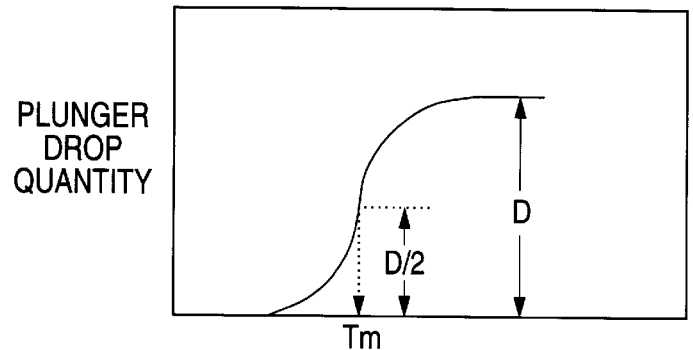
FIG. 14 is a graph showing plunger drop quantity with respect to toner temperature.

Toner is made of thermoplastic binders containing coloring matter of yellow, magenta, cyan and the like. When experimental evaluation was made in this case, three kinds of polyester tone having temperature-viscosity properties shown in FIG. 13 were used. Toner A has a superposed mean molecular weight (Mw) of 13,000, a melting temperature (Tm) of 110° C. and a melting viscosity ($\eta$) of 1,500 Pa.s, toner B has a superposed mean molecular weight (Mw) of 54,000, a melting temperature (Tm) of 120° C. and a melting viscosity ($\eta$) of 4,000 Pa.s, and toner C has a superposed mean molecular weight (Mw) of 78,600, a melting temperature (Tm) of 140° C. and a melting viscosity ($\eta$) of 10,000 Pa.s. The toner for use has a mean particle size of 7 $\mu$m and the quantity of toner of each color on the recording paper is arranged so that the exposure and developing conditions are set to justify 0.4 mg/cm$^2$–0.7 mg/cm$^2$, depending on the content of the coloring matter. In this case, the quantity above was set at 0.65 mg/cm$^2$ for each color.

Referring to Table 1, methods of producing the aforesaid toner A, B, C will be described.

TABLE 1

| | | (parts by weight) Polyester resin | | |
|---|---|---|---|---|
| | | A | B | C |
| Alcoholic components | BPA—EO | 30 | 25 | 10 |
| | BPA—PO | | 25 | 40 |
| | Cyclohexanediol | 15 | | |
| Acid components | Terephthalic acid | 55 | 30 | 35 |
| | Dodecenylsuccinic acid | | 15 | 10 |
| | Anhydrous trimellitic acid | | 5 | 5 |

BPA—EO: Polyoxyethylene(2.2)-2.2-bis(4-hydroxyphenyl)propane
BPA—PO: Polyoxypropylene(2.2)-2.2-bis(4-hydroxyphenyl)propane Polyhydric alcohol and polyhydric carboxylic acid shown in Table 1 were put in a stainless agitator; namely, a 1-liter 4-port round flask having a glass nitrogen gas introducing pipe and a sulfidation condenser and the flask was set in a mantle heater. Subsequently, nitrogen gas was introduced from the gas introducing pipe and while the inside of the flask was maintained in an inactive gas atmosphere, the temperature therein was raised. Then dibutyltin oxide of 0.05 was added and while the temperature of the reaction product was maintained at 200° C. to allow it to react for a predetermined reaction time, polyester resins for the toner A, B, C were obtained. Further, 6 parts by weight of yellow pigment for 100 parts by weight of the polyester resin A thus obtained, 4.5 parts by weight of magenta pigment for 100 parts by weight of the polyester resin A thus obtained, 4.5 parts by weight of cyan pigment for 100 parts by weight of the polyester resin A thus obtained, and 4 parts by weight of carbon black for 100 parts by weight of the polyester resin A thus obtained were mixed together and melted in an extruder before being kneaded. Further, the polyester resin A containing the combination of the pigments was cooled and crushed in a jet mill. Then the crushed material was classified to obtain a toner set A (hereinafter called the 'toner A') containing yellow, magenta, cyan and black toner each having a mean volume diameter of 7 $\mu$m. Similarly, a toner set B (hereinafter called the 'toner B') using the polyester resin B and a toner set C (hereinafter called the 'toner C') using the polyester resin C were also obtained.

Referring to FIG. 17 again, the description will be continued.

Vertical lines/inch in the same direction were used for each color on the screen and with respect to the number of lines, five kinds including 150 lines/inch, 200 lines/inch, 300 lines/inch, 400 lines/inch and 600 lines/inch were employed.

The diameter of the light beam for use in the exposure unit 20 was set to 20 $\mu$m so that an image excellent in contrast was obtained. The diameter in this case means a diameter with light beam energy equivalent to the maximum energy of the light beam at 1/e$^2$. In reference to the aforementioned five kinds of the number of lines; namely, 150 lines/inch, 200 lines/inch, 300 lines/inch, 400 lines/inch and 600 lines/inch, given the reflectance contrast of an image was set to 1.0 in an area where an input image area factor was 100%, the reflectance contrast in an area where the input image area factor was 50% ranged over 0.95, 0.90, 0.82, 0.72 and 0.58.

The intermediate transfer unit 50 was of double-layer structure including a base layer and a surface layer.

A polyimide film 70 $\mu$m thick with carbon black added thereto was used for the base layer. In order to transfer the toner image from the photoconductor to the intermediate transfer unit electrostatically without image turbulence, the volume resistivity of the base layer was adjusted to $10^{10}$ $\Omega$.cm by varying the loadings of the carbon black. For the base layer, however, a sheet which is 10–300 $\mu$m thick and highly heat resistant may be used, for example; more specifically, a polymer sheet of polyester, polyethylene terephthalate, polyether sulfon, polyether ketone, polysulfon, polyimide, polyimideamide, polyamide or the like is usable.

In order to transfer the toner image from the photoconductor to the intermediate transfer unit electrostatically without image turbulence, the volume resistivity of the surface layer was adjusted to $10^{14}$ $\Omega$.cm and when the toner image was simultaneously transferred from the intermediate transfer unit and fixed to paper, a silicone copolymer of 40 in rubber hardness and 50 $\mu$m in thickness was used. The silicone copolymer is elastic and has a surface adhesive to toner at a normal temperature and in order to have the toner transferred to the recording medium with efficiency, it also has the property of readily detaching the molten fluidized toner. Thus, the use of such a silicone copolymer as the surface layer is most suitable. For the surface layer, moreover, a resin layer which is 1–100 μm thick and has excellent release properties, for example, may be used; namely, a tetrafluoroethylene perfluoroalkylvinylether copolymer, polytetrafluoroethylene or the like.

For the heating roll and the press roll, use may be made of a metal roll or what is provided with a heat-resistant elastic layer of silicone rubber or the like laid thereon. The heating roll also has a heat source inside and the heating temperature is controlled so that the temperature of the toner in the heating area is set at a toner melting temperature (Tm) or higher. Further, the heating area is provided so as to make the intermediate transfer unit, the toner image and the recording paper P adhere to each other satisfactorily and prevent not only the combination of them from locally becoming afloat but also the recording paper P from being wrinkled and shifted. The proper nip pressure may range from $1\times10^5$ Pa to $1\times10^6$ Pa. Then aluminum hollow rolls, each of which was covered with a layer of silicone rubber having a hardness of 55 and a thickness of 3 mm, was used for the heating and press rolls. A halogen lamp was also used as the heat source inside the heating roll and the nip pressure was set to $5.5\times10^5$ Pa.

There is also provided a heating-area exit cooling unit 7 which comes into contact with the recording paper P immediately after passage through the heating area. The heating-area exit cooling unit 7 is intended to lower the temperature of the toner immediately after passage through the heating area and the same effect is achievable likewise even when the toner is cooled not from the paper side but the intermediate transfer unit side immediately after passage through the heating area. This is also the case with the toner which is cooled from both sides immediately after passage through the heating area. According to this embodiment of the invention, an air-cooling unit for sending out cooling air was used and the cooling condition was varied by regulating the air flow.

Plain paper J manufactured by Fuji Xerox Co., Ltd was used as the recording paper P and coat paper J manufactured thereby was also used as smooth surface paper. The measured value of the 10 points mean roughness SRz of the paper J by means of a contact three-dimensional surface roughness meter is approximately 20 μm, whereas that of the 10 points means roughness SRz of the coat paper J is 5 μm as aforementioned.

Figure 15:
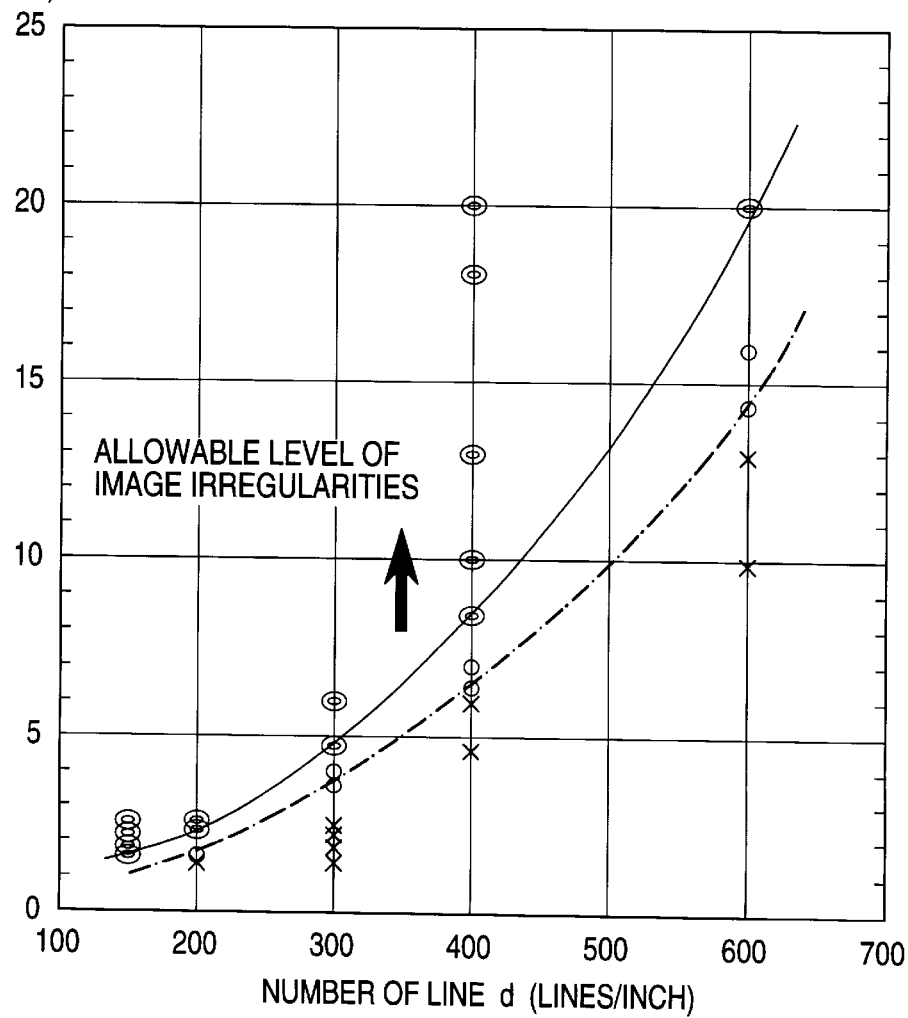
FIG. 15 is a graph showing image irregularities allowing level with respect to lines/inch of an image and toner viscosity.

With the arrangement above, the toner was heated up to the toner melting temperature in the heating area at a conveying speed of 80 mm/s on the part of the intermediate transfer unit 50, and the viscosity η (Pa.s) of the aforementioned three kinds of toner immediately after passage through the heating area was varied by varying the air flow from the heating-area exit cooling unit 7 so as to evaluate image irregularities by outputting each image with the aforementioned number of lines onto the surface paper (coat paper J). FIG. 15 shows the results of evaluation. The viscosity of toner immediately after passage through the heating area was obtained by obtaining a heat transfer coefficient h on each air cooling condition, calculating the temperature at 50 ms after passage through the heating area and referring to a graph of FIG. 13.

Figure 16:
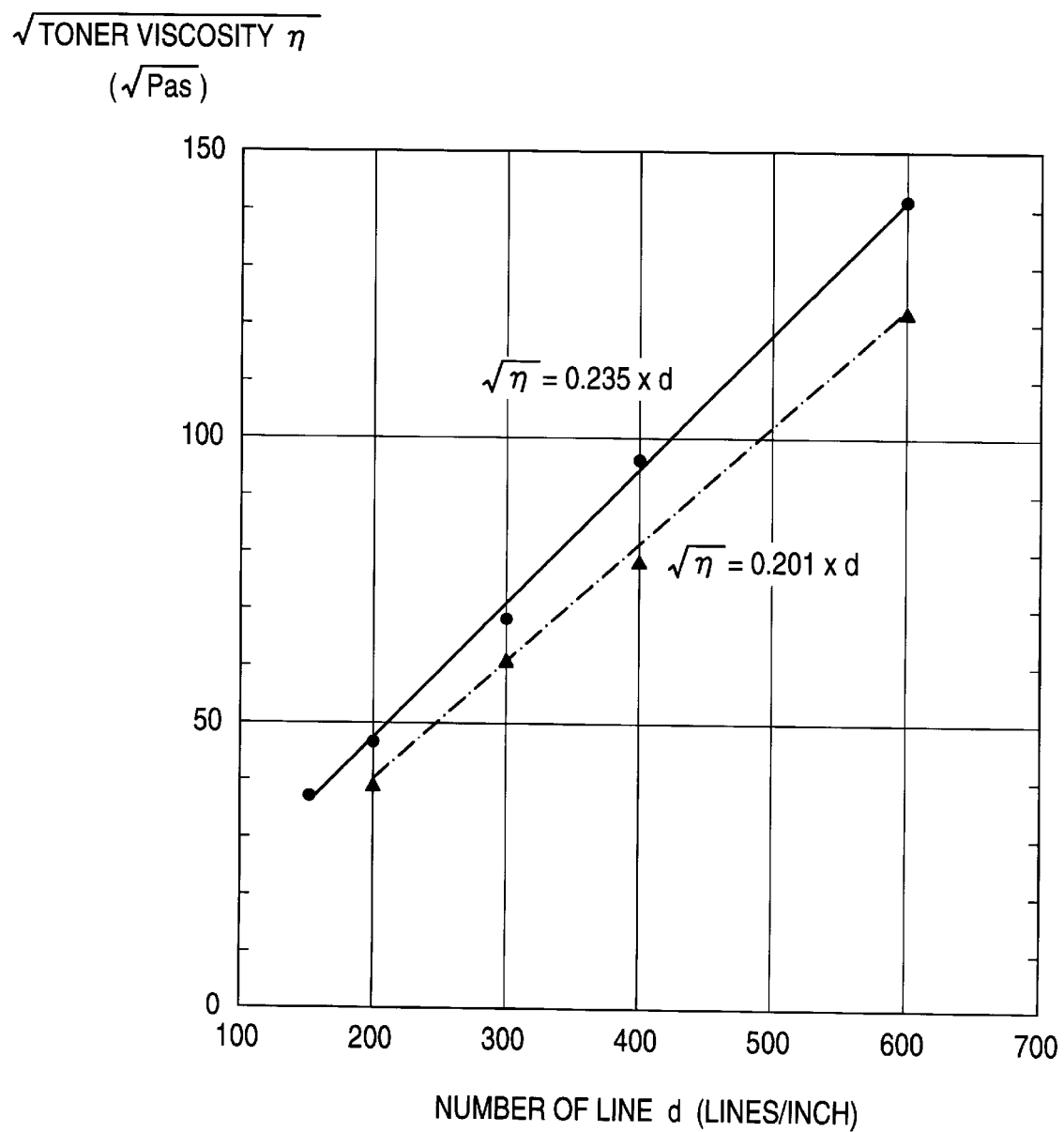
FIG. 16 is a graph showing the square root of the lowest viscosity indicating image irregularities allowing level with respect to lines/inch of an image.

As described by reference to FIG. 16, the relation between the number of lines d and the viscosity η by which a good image is obtainable without being troubled by the image irregularities is found satisfying the following:

$$\eta \geq 0.040 \cdot d^2 \tag{1}$$

More preferably, the relation between the number of lines d and the viscosity η by which a good image is obtainable without the detection of any image irregularities is found satisfying the following:

$$\eta \geq 0.055 \cdot d^2 \tag{2}$$

The aforementioned three kinds of toner was used and by varying the air flow from the heating-area exit cooling unit 7, the viscosity η of toner immediately after passage through the heating area was regulated so as to output each image with the aforementioned number of lines onto the plain paper (paper J) in a manner satisfying the Eq. (1) above. Then a good image substantially without conspicuous image irregularities was obtained in all cases where any number of lines were employed. When the viscosity η was regulated in a manner satisfying the Eq. (2) above, no image irregularities were observed even though the output image was carefully examined.

Without the provision of the heating-area exit cooling unit 7, on the other hand, image irregularities occurred with 200 lines/inch, 300 lines/inch, 400 lines/inch and 600 lines/inch, though good image quality free from image irregularities was obtained with 150 lines/inch image quality when the toner A was used. When the toner B was used, image irregularities occurred with 400 lines/inch and 600 lines/inch, though good image quality free from image irregularities was obtained with 150 lines/inch, 200 lines/inch and 300 lines/inch image quality. When the toner C was used, further, image irregularities occurred with 600 lines/inch, though good image quality free from image irregularities was obtained with 150 lines/inch, 200 lines/inch, 300 lines/inch and 400 lines/inch image quality.

(Embodiment 2)

Figure 18:
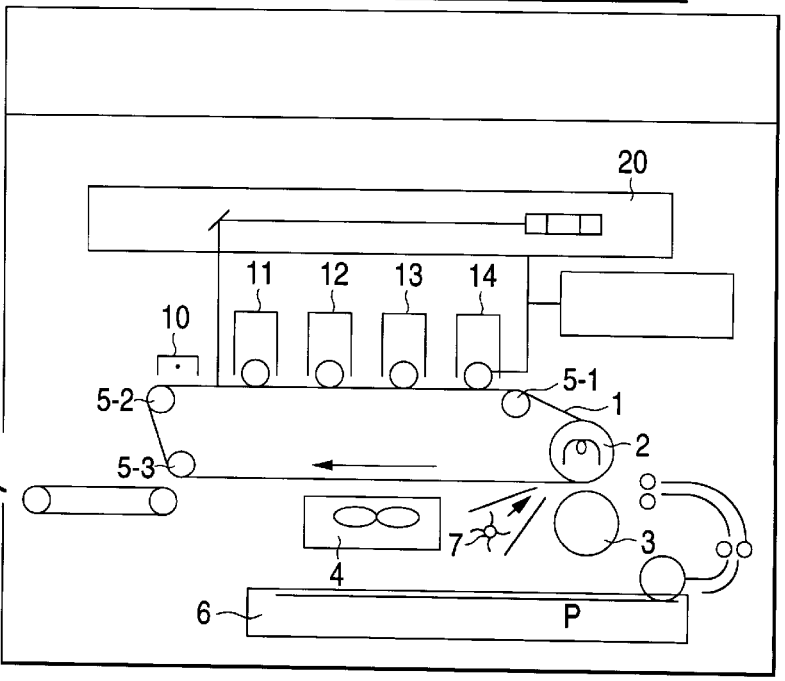
FIG. 18 is a block diagram illustrating an image forming apparatus as a second embodiment of the invention.

FIG. 18 is a block diagram illustrating an image forming apparatus as a second embodiment of the invention. According to this embodiment of the invention, a belt-like photoconductor 1 is installed and supported with rollers 5-1, 5-2, 5-3 and a heating roll 2, whereby it is rotatably moved in the direction of an arrow. A press roll 3 is placed opposite to the heating roll 2 with a space held therebetween. The positions of the heating roll 2 and the press roll 3 may be inverted and the press roll 3 may also be a heating roll having a heat source inside. The photoconductor 1 is uniformly charged by a charger 10 before being scanned and exposed by an exposure unit 20 to a light beam which is turned on or off in response to an image signal, so that an electrostatic latent image is formed. The electrostatic latent image is developed by developing devices 11, 12, 13, 14 into toner images as digital images indicating density by area modulation. These developing devices 11, 12, 13, 14 respectively contain black, yellow, magenta and cyan color toner and by repeating charging, exposure and developing, a toner image having a plurality of colors is formed on the photoconductor 1.

As in Embodiment 1 of the invention, vertical lines/inch were used on the screen and with respect to the number of lines, five kinds including 150 lines/inch, 200 lines/inch, 300 lines/inch, 400 lines/inch and 600 lines/inch were employed.

The diameter of the light beam for use in the exposure unit 20 was set to 20 μm so that an image excellent in contrast was obtained. In reference to the aforementioned five kinds of the number of lines; namely, 150 lines/inch, 200 lines/inch, 300 lines/inch, 400 lines/inch and 600 lines/inch, given the reflectance contrast of an image was set to 1.0 in an area where an input image area factor was 100%, the reflectance contrast in an area where the input image area factor was 50% ranged over 0.95, 0.90, 0.82, 0.72 and 0.58.

The press roll 3 is forced to contact the heating roll 3 in synchronization of the feeding of recording paper P from the tray 6. Then the photoconductor 1 holding the toner image of the plurality of colors and the recording paper P is moved between the heating roll 2 and the press roll 3 at proper timing, pressed and heated. The toner heated up to the melting temperature or higher is softened, melted and penetrated through the recording paper P and besides set before transferred and fixed. As an arrangement of a cooling unit 4 and a heating-area exit cooling unit 7 is similar to the case of Embodiment 1 of the invention, the description thereof will be omitted. The photoconductor 1 and the recording paper P thus cooled by the cooling unit 4 are conveyed further and the recording paper P is separated from the photoconductor 1 at the roller 5-3 having a small curvature radius because of the nerve (stiffness) of the recording paper P itself. Thus, a color image is formed on the recording paper P. The surface of the toner image transferred and fixed to the recording paper P follows the surface of the photoconductor 1 and becomes smoothed and glossy.

For the photoconductor 1, use can be made of various heat resistant photosensitive materials (Se, a-Si, a-SiC, CdS, etc).

The same toner as in Embodiment 1 of the invention was used and the quantity of toner of each color on the recording paper was also set at 0.65 mg/cm$^2$ as in Embodiment 1 of the invention.

The heating and press rolls used were similar to those used in Embodiment 1 of the invention, and the heat source as well as pressure in a heating area were set under the same conditions as those in Embodiment 1 of the invention.

Coat paper J manufactured by Fuji Xerox Co., Ltd was used as the recording paper P.

With the arrangement above, the toner was heated up to the toner melting temperature in the heating area at a conveying speed of 80 mm/s on the part of the photoconductor, and the viscosity $\eta$ (Pa.s) of the aforementioned three kinds of toner immediately after passage through the heating area was regulated by regulating the air flow from the heating-area exit cooling unit 7 so as to evaluate image irregularities by outputting each image with the aforementioned number of lines onto the surface paper (coat paper J) so that the aforementioned Eq. (1) was satisfied.

Consequently, a good image almost free from image irregularities with any one of the lines/inch was obtained. A better image was also obtained by regulating the lines/inch to satisfy the aforementioned Eq. (2).

(Embodiment 3)

Figure 19:
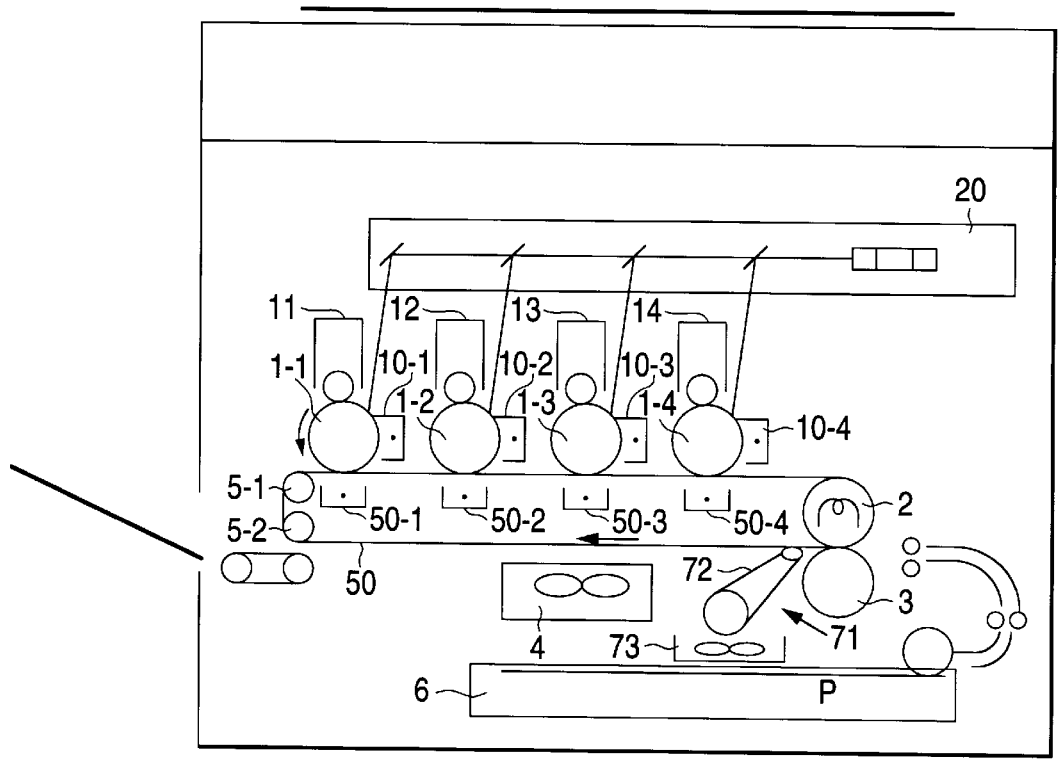
FIG. 19 is a block diagram illustrating an image forming apparatus as a third embodiment of the invention.

FIG. 19 is a block diagram illustrating an image forming apparatus as a third embodiment of the invention. In FIG. 19, photoconductors, chargers, light beam scanning devices, developing devices and transfer devices for use in forming an image on an intermediate transfer unit 50 are similar to those used in Embodiment 1 of the invention (see FIG. 17) and the description thereof will be omitted. Further, a heating roll and a press roll for transferring and fixing a toner image onto recording paper P from the intermediate transfer unit 50 and their operation are also similar to those employed in Embodiment 1 of the invention.

According to this embodiment of the invention, a heating area exit cooling unit 71 which is brought into contact with the recording paper P immediately after passage through a heating area is provided. The heating area exit cooling unit 71 is provided with an endless belt 72 stretched between two rolls and also a cooling unit 73 for lowering the temperature of the endless belt 72. A part of the endless belt 72 makes contact with the recording paper P immediately after passage through the heating area and another part thereof is cooled by the cooling unit 73. Any kind of cooling unit 73 may be used for lowering the temperature of the belt and may also be of an air cooling type for sending out cooling air or of a water cooling type. The cooling unit 73 may be arranged so as to effect heat exchange by making contact with another low temperature body such as a low temperature intermediate transfer unit before the heating area. The endless belt 72 is brought into contact with the recording paper P to lower the toner temperature between the recording paper P and the intermediate transfer unit 50, so that it may be made of suitable material such as metal including stainless, aluminum, copper or the like excellent in thermal conductivity and having a large thermal capacity. A copper belt and an air cooling unit for sending out cooling air were used as the endless belt 72 and the cooling unit 73 according to this embodiment of the invention, respectively.

With the arrangement above, the toner was heated up to the toner melting temperature in the heating area at a conveying speed of 80 mm/s on the part of the intermediate transfer unit, and the viscosity $\eta$ (Pa.s) of the aforementioned three kinds of toner immediately after passage through the heating area was regulated by regulating the air flow from the heating-area exit cooling unit 73 to evaluate image irregularities by outputting each image with the aforementioned number of lines onto the surface paper (coat paper J) so that the aforementioned Eq. (1) was satisfied.

Consequently, a good image free from image irregularities with any one of the lines/inch was obtained. A better image was also obtained by regulating the lines/inch to satisfy the aforementioned Eq. (2).

(Embodiment 4)

Figure 20:
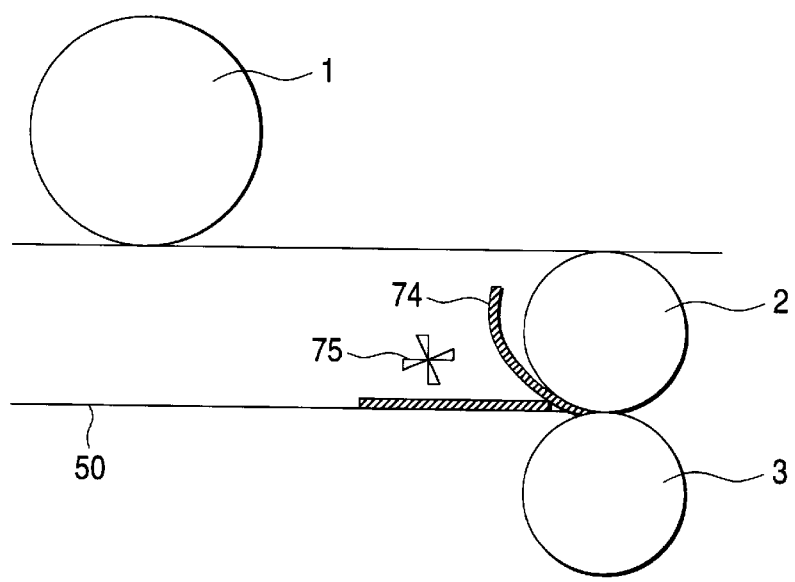
FIG. 20 a diagram showing a portion that makes an image forming apparatus in a fourth embodiment of the invention different from the one shown in the first embodiment thereof.

FIG. 20 shows a portion that makes an image forming apparatus in Embodiment 4 of the invention different from the one shown in Embodiment 1 thereof.

In FIG. 20 showing Embodiment 4 of the invention, photoconductors, chargers, light beam scanning devices, developing devices and transfer devices for use in forming an image on an intermediate transfer unit 50 are similar to those used in Embodiment 1 of the invention and the description thereof will be omitted. Further, a heating roll and a press roll for transferring and fixing a toner image onto recording paper P from the intermediate transfer unit 50 and their operation are also similar to those employed in Embodiment 1 of the invention.

According to this embodiment of the invention, a fixed member which is formed with a metal plate and brought into contact with the intermediate transfer unit 50 as a heating area exit cooling unit 74 for cooling temperature of toner between recording paper P and the intermediate transfer unit 50 immediately after passage of a heating area. One end of the metal plate is, as shown in FIG. 20, bent so that it can contact the intermediate transfer unit satisfactorily in a position immediately after an heating area exit. According to this embodiment of the invention, the metal plate is made of aluminum. In addition, a metal plate such as a stainless plate, a copper plate or the like may be used on condition that it is excellent in thermal conductivity and has a large thermal capacity. Further, an air cooling fan for sending cooling air to the bent area is provided. The air cooling fan 75 is used for lowering the temperature of the metal plate and may also be of a water cooling type instead of an air cooling type for sending out cooling air. The cooling unit 75 may be arranged so as to effect heat exchange by making contact with another low temperature body such as a low temperature intermediate transfer unit before the heating area.

With the arrangement above, the toner was heated up to the toner melting temperature in the heating area at a conveying speed of 80 mm/s on the part of the intermediate transfer unit, and the viscosity η (Pa.s) of the aforementioned three kinds of toner immediately after passage through the heating area was regulated by regulating the air flow from the cooling fan 75 of the heating-area exit cooling unit 74 to evaluate image irregularities by outputting each image with the aforementioned number of lines onto the surface paper (coat paper J) so that the aforementioned Eq. (1) was satisfied.

Consequently, a good image almost free from image irregularities with any one of the lines/inch was obtained. A better image was also obtained by regulating the lines/inch to satisfy the aforementioned Eq. (2).

Although the cooling member is provided on the intermediate transfer unit side according to this embodiment of the invention, it may be installed on the paper side or on both the intermediate transfer unit and paper sides.

(Embodiment 5)

Figure 21:
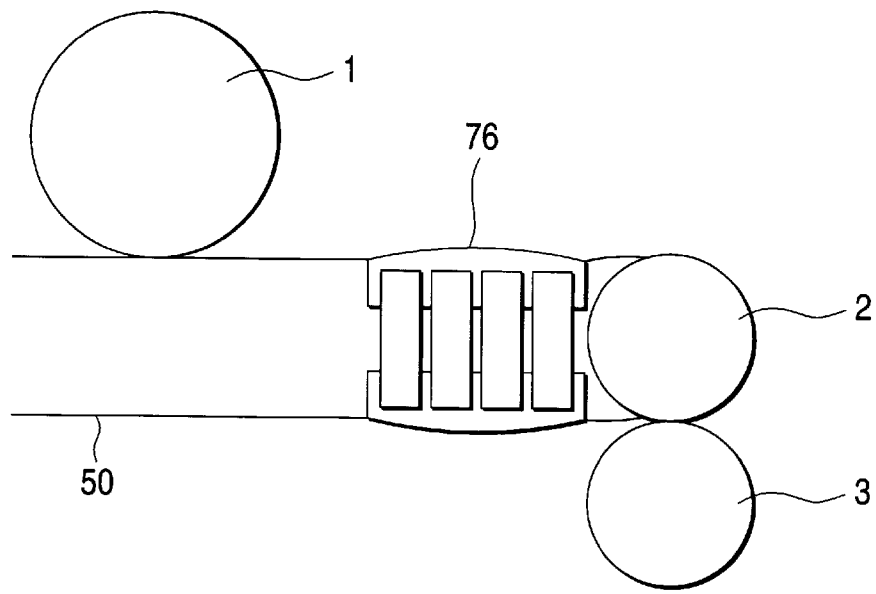
FIG. 21 is a diagram showing a portion that makes an image forming apparatus in a fifth embodiment of the invention different from the, one shown in the first embodiment thereof.
Figure 22:
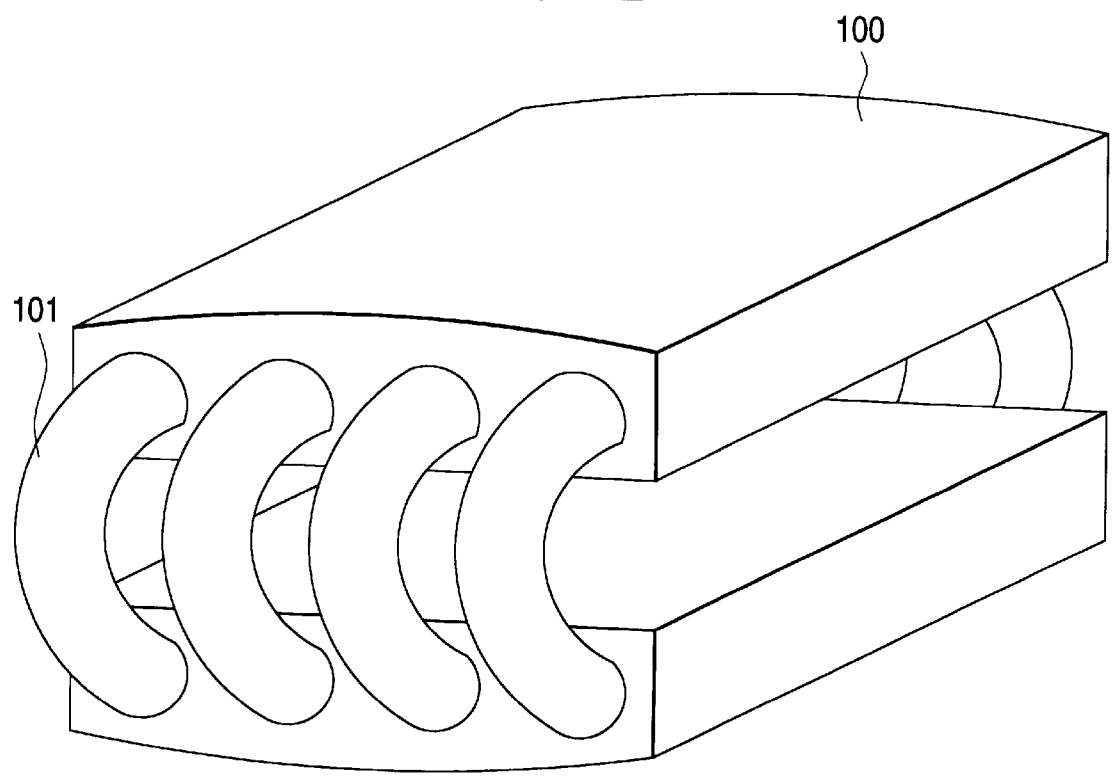
FIG. 22 is a perspective view of a heating area exit cooling unit in the fifth embodiment of the invention shown in FIG. 21.

FIG. 21 shows a portion that makes an image forming apparatus in Embodiment 5 of the invention different from the one shown in Embodiment 1 thereof; and FIG. 22 a perspective view of a heating area exit cooling unit in Embodiment 5 thereof.

In Embodiment 5 of the invention, photoconductors, chargers, light beam scanning devices, developing devices and transfer devices for use in forming an image on an intermediate transfer unit 50 are similar to those used in Embodiment 1 of the invention and the description thereof will be omitted. Further, a heating roll and a press roll for transferring and fixing a toner image onto recording paper P from the intermediate transfer unit 50 and their operation are also similar to those employed in Embodiment 1 of the invention.

According to this embodiment of the invention, a fixed member which is provided with heat pipes of FIG. 21 and brought into contact with the intermediate transfer unit 50 as a heating area exit cooling unit 76 for lowering the temperature of toner between recording paper P and the intermediate transfer unit 50 immediately after passage of a heating area. The heating area exit cooling unit 76 is arranged so that a plurality of heat pipes 101 are used to connect two metal plates 100 in contact with the intermediate transfer unit. Aluminum plates 20 mm thick is used as the metal plates 100 according to this embodiment of the invention. Moreover, the cooling capacity is regulated by the use of four kinds of copper heat pipes different in inner configuration and diameter as the heat pipes 101.

With the arrangement above, the toner was heated up to the toner melting temperature in the heating area at a conveying speed of 80 mm/s on the part of the intermediate transfer unit, and the viscosity η (Pa.s) of the aforementioned three kinds of toner immediately after passage through the heating area was regulated by varying the inner configuration, diameter and the number of pieces of heat pipes so as to evaluate image irregularities by outputting each image with the aforementioned number of lines onto the surface paper (coat paper J) so that the aforementioned Eq. (1) was satisfied.

Consequently, a good image almost free from image irregularities with any one of the lines/inch was obtained. A better image was also obtained by regulating the lines/inch to satisfy the aforementioned Eq. (2).

Although the metal plate on the heat radiating side different from where the toner between the recording paper P and the intermediate transfer unit 50 is cooled is brought into contact with the intermediate transfer unit according to this embodiment of the invention, the heat radiating side may be air cooled by means of an air cooling fan or water cooled instead of bringing that side into contact with the intermediate transfer unit 50. Further, the heating area exit cooling unit 76 may be installed on the paper side or both the intermediate transfer unit and paper sides.

Figure 23:
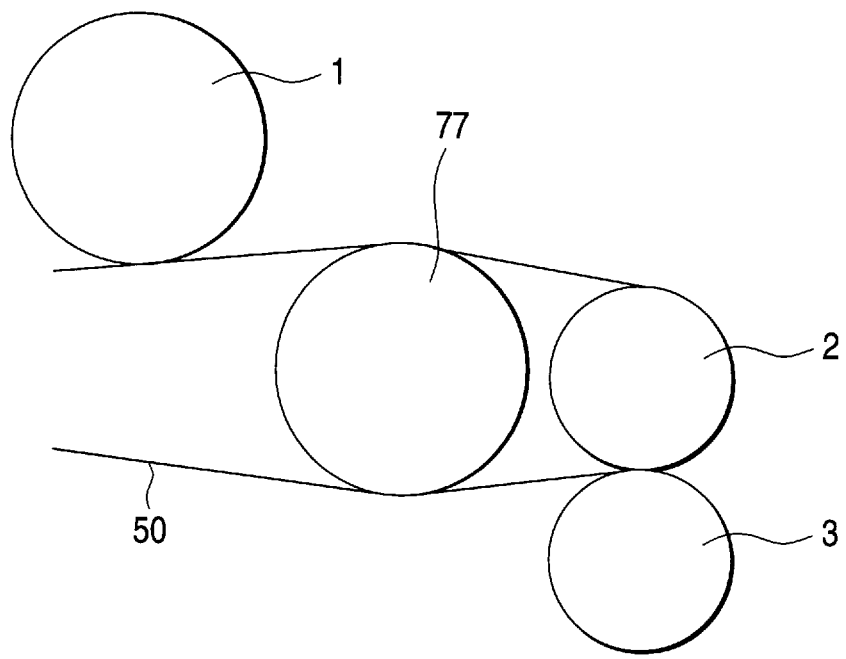
FIG. 23 is a diagram showing a modified example of the fifth embodiment of the invention.
Figure 24:
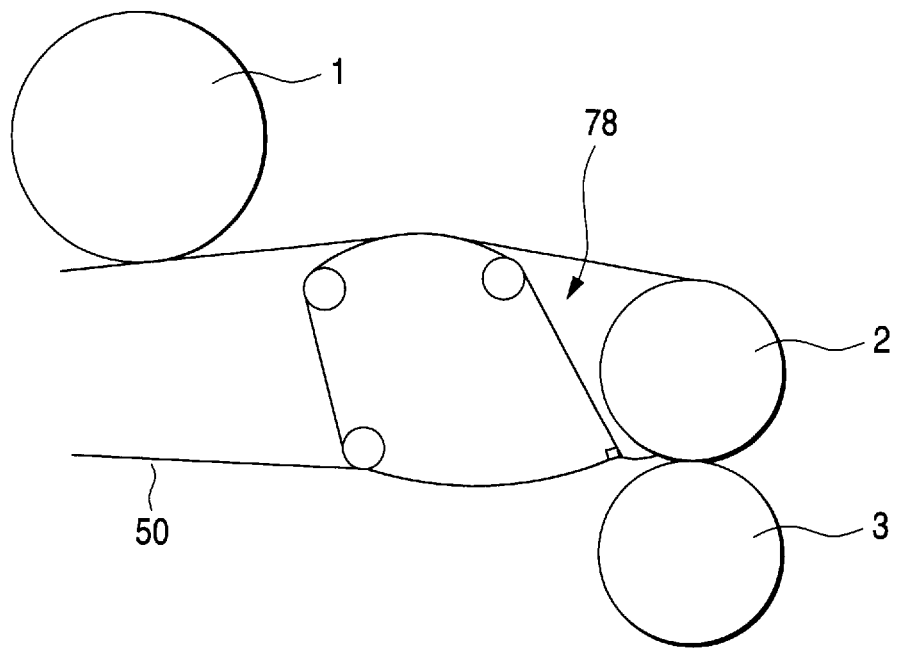
FIG. 24 is a diagram showing a modified example of the fifth embodiment of the invention.

FIGS. 23 to 24 show modified examples in Embodiment 5 of the invention.

As shown in FIGS. 23 to 24, a heating area exit cooling unit having a roll-like cyclic moving member 77 or a belt-like cyclic moving member 78 in place of the heat pipes.

(Embodiment 6)

Figure 25:
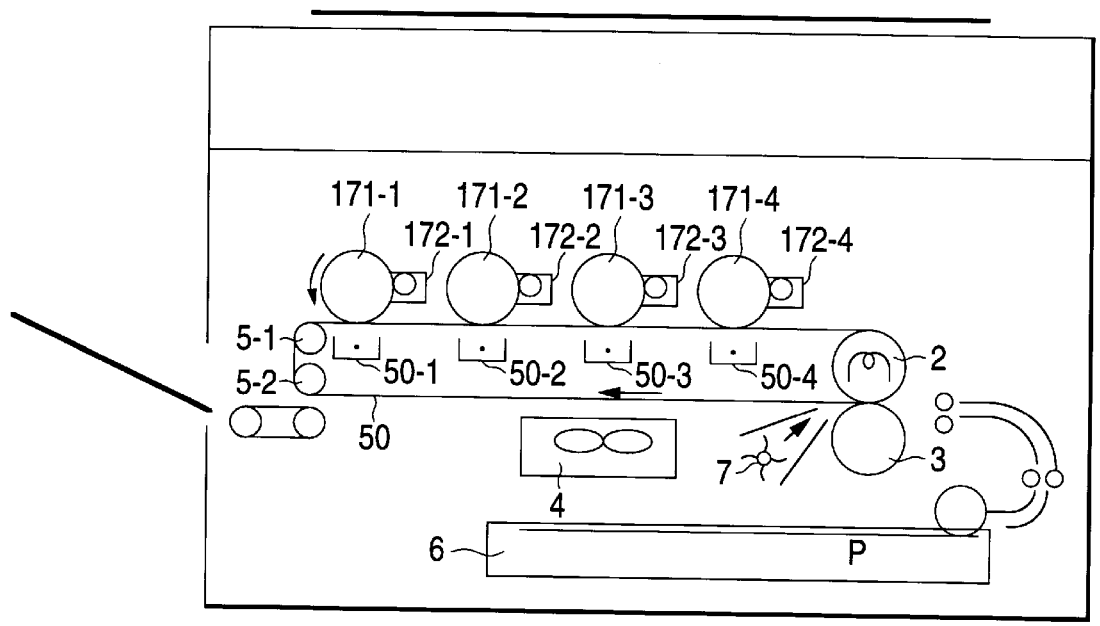
FIG. 25 is a block diagram illustrating an image forming apparatus as a sixth embodiment of the invention.

FIG. 25 is a block diagram of an image forming apparatus in Embodiment 6 of the invention. This apparatus is the embodiment based on a toner direct jumping system.

Black, yellow, magenta and cyan color toner image forming apparatus 172-1, 172-2, 172-3, 172-4 are used to have toner particles flown on rotary drums 171-1, 171-2, 171-3, 171-4 rotating in the direction of an arrow according to image information and toner images of respective colors are formed on the rotary drums 171-1, 171-2, 171-3, 171-4.

Figure 26:
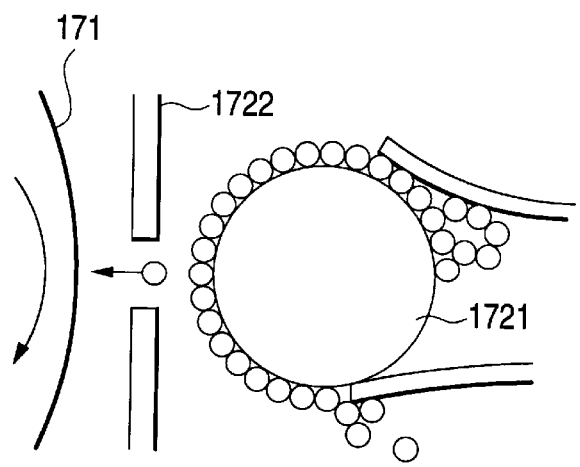
FIG. 26 is a schematic block diagram of a toner image forming apparatus in the sixth embodiment of the invention shown in FIG. 25.

FIG. 26 is a schematic block diagram of the toner image forming apparatus.

A charged toner particle supply roll 1721 is installed in this case and the charged toner particles are conveyed by the charged toner particle supply roll 1721 to a position opposite to the rotary drum 171. A control electrode 1722 is placed in a position between the charged toner particle supply roll 1721 and the drum 171 and control voltage corresponding to an input image signal is applied. The charged toner particles conveyed by the charged toner particle supply roll 1721 are flown toward the rotary drum 171 in accordance with the control voltage applied to the control electrode 1722, whereby a toner image with the toner particles is formed on the rotary drum 171.

The toner images formed on the rotary drums 171-1, 171-2, 171-3, 171-4 are successively transferred by transfer devices 50-1, 50-2, 50-3, 50-4 onto a intermediate transfer unit 50 as in Embodiment 1, so that a toner image of plurality of colors is formed on the intermediate transfer unit 50. Since a heating roll and a press roll for transferring and fixing the toner image onto recording paper P from the intermediate transfer unit 50 and a heating area exit cooling unit 7 and their operation are also similar to those employed in Embodiment 1 of the invention, the description thereof will be omitted.

According to this embodiment of the invention likewise, given the reflectance contrast of an image was set to 1.0 in an area where an input image area factor was 100%, the size of the basic pixel and the control voltage applied to the control electrode were controlled so that the reflectance contrast in an area where the input image area factor was 50% was 0.5 or greater.

With the arrangement above, the toner was heated up to the toner melting temperature in the heating area at a conveying speed of 80 mm/s on the part of the intermediate transfer unit, and the viscosity η (Pa.s) of the toner immediately after passage through the heating area was regulated to evaluate image irregularities by outputting each image onto the surface paper (coat paper J) so that the aforementioned Eq. (1) was satisfied. Consequently, a good image almost free from image irregularities was obtained. A better image was also obtained by regulating the lines/inch to satisfy the aforementioned Eq. (2).

(Embodiment 7)

Figure 27:
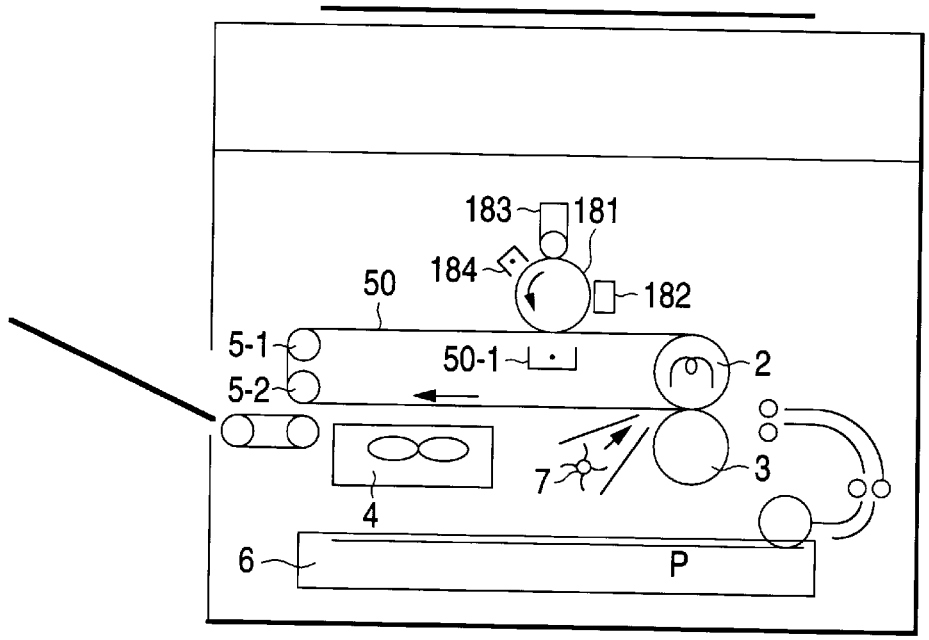
FIG. 27 is a block diagram illustrating an image forming apparatus as a seventh embodiment of the invention.

FIG. 27 is a block diagram of an image forming apparatus in Embodiment 7 of the invention. This apparatus is the embodiment based on a magnetgraphy system.

This apparatus is provided with a magnetic drum 181 whose surface is covered with a magnetic material layer. The usable magnetic layer is generally similar to that of a magnetic tape and formed by dispersing ferromagnetic powder such as magnetite or ferrite on a binder and applying the resultant on the surface of the base of the drum or forming a metal film on the surface of the base by vapor deposition, sputtering or plating.

A magnetic latent image corresponding an input image signal is made by a magnetic head 182 to the magnetic layer on the surface of the magnetic drum 181. The usable magnetic head 182 is of a system for letting current flow through a coil so as to provide strong magnetic flux for the magnetic material layer of the magnetic drum 181 or erasing or inverting the magnetism of a magnetized magnetic material layer using a heat generating element or a laser. A system of magnetizing a demagnetized magnetic material layer is employed according to this embodiment of the invention.

The magnetic drum 181 is rotated in the direction of an arrow and a magnetic latent image is developed by supplying magnetic heat-melting fixing toner from a magnetic developing device 183, whereby a toner image is formed.

The magnetic developing device is of a system for magnetically holding magnetic toner in the form of a brush on a rotatable magnetic sleeve and making the magnetic toner thus held contact the magnetic drum 181 or placing closely opposite thereto.

The toner image thus formed on the magnetic drum 181 is made to stick to the surface of the magnetic drum 181 by magnetic force. The toner image is charged by a charger 184 to electrostatically transfer it onto a intermediate transfer unit 50. The toner image may be transferred under pressure to the intermediate transfer unit not electrostatic electricity but by means of the elasticity and adhesion of the surface of the intermediate transfer unit.

The toner image formed on the magnetic drum 181 is transferred by a transfer devices 50-1 onto the intermediate transfer unit 50 and formed on the intermediate transfer unit 50 as in Embodiment 1 of the invention. Since a heating roll and a press roll for transferring and fixing the toner image onto recording paper P from the intermediate transfer unit 50 and a heating area exit cooling unit 7 and their operation are also similar to those employed in Embodiment 1 of the invention, the description thereof will be omitted.

According to this embodiment of the invention, given the reflectance contrast of an image was set to 1.0 in an area where an input image area factor was 100%, the size of the basic pixel and the magnetizing quantity generated from the magnetic head were controlled so that the reflectance contrast in an area where the input image area factor was 50% was 0.5 or greater.

With the arrangement above, the toner was heated up to the toner melting temperature in the heating area at a conveying speed of 80 mm/s on the part of the intermediate transfer unit, and the viscosity $\eta$ (Pa.s) of the toner immediately after passage through the heating area was regulated to evaluate image irregularities by outputting each image onto the surface paper (coat paper J) so that the aforementioned Eq. (1) was satisfied. Consequently, a good image almost free from image irregularities was obtained. A better image was also obtained by regulating the lines/inch to satisfy the aforementioned Eq. (2).

(Embodiment 8)

Figure 28:
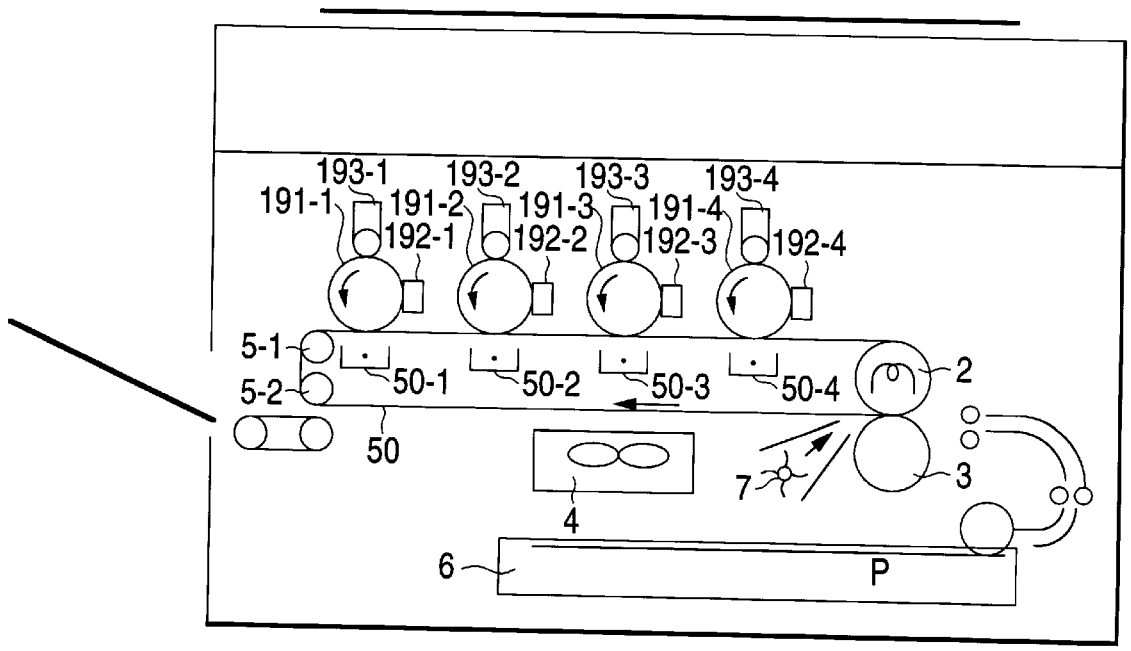
FIG. 28 is a block diagram illustrating an image forming apparatus as an eighth embodiment of the invention.

FIG. 28 is a block diagram of an image forming apparatus in Embodiment 8 of the invention.

This apparatus is provided with dielectric drums 191-1, 191-2, 191-3, 191-4. Electrostatic latent images are formed on the surfaces of the dielectric drums 191-1, 191-2, 191-3, 191-4 by ionoheads 192-1, 192-2, 192-3, 192-4. The ionoheads 192-1, 192-2, 192-3, 192-4 are each equipped with charge generating means utilizing, for example, corona discharge or creeping discharge and slit-like electric field control means, and ground potential or proper bias potential is applied to the bases of the dielectric drums 191-1, 191-2, 191-3, 191-4. The charge generated by the charge generating means of the ionoheads 192-1, 192-2, 192-3, 192-4 is injected into the surfaces of the dielectric drums 191-1, 191-2, 191-3, 191-4 by an electric field corresponding to the image information formed between the electric field control means and the dielectric drums 191-1, 191-2, 191-3, 191-4 and further electrostatic latent images are formed on the surfaces of the dielectric drums 191-1, 191-2, 191-3, 191-4.

The dielectric drums 191-1, 191-2, 191-3, 191-4 are rotated in the direction of arrows and developing agents are supplied by developing devices 193-1, 193-2, 193-3, 193-4 for developing toner of black, yellow, magenta and cyan colors to the electrostatic latent images on the surfaces of the dielectric drums 191-1, 191-2, 191-3, 191-4, so that toner images of respective colors are formed on the dielectric drums 191-1, 191-2, 191-3, 191-4.

The toner images formed on the dielectric drums 191-1, 191-2, 191-3, 191-4 are, as in Embodiment 1 of the invention, successively transferred by transfer devices 50-1, 50-2, 50-3, 50-4 to a intermediate transfer unit 50 to form a toner image of a plurality of colors on the intermediate transfer unit 50. Since a heating roll and a press roll for transferring and fixing the toner image onto recording paper P from the intermediate transfer unit 50 and a heating area exit cooling unit 7 and their operation are also similar to those employed in Embodiment 1 of the invention, the description thereof will be omitted.

According to this embodiment of the invention, given the reflectance contrast of an image was set to 1.0 in an area where an input image area factor was 100%, the size of the basic pixel and the charge quantity generated from the ionohead were controlled so that the reflectance contrast in an area where the input image area factor was 50% was 0.5 or greater, whereby the electrostatic latent image was formed on each dielectric drum.

With the arrangement above, a conveying speed of 80 mm/s on the part of the intermediate transfer unit, and the viscosity $\eta$ (Pa.s) of the toner immediately after passage through the heating area were regulated to evaluate image irregularities by outputting each image onto the surface paper (coat paper J) so that the aforementioned Eq. (1) was satisfied. Consequently, a good image almost free from image irregularities was obtained. A better image was also obtained by regulating the lines/inch to satisfy the aforementioned Eq. (2).

As set forth above, according to the present invention, the turbulence of the image structure in the medium density portion due to the flow of toner after passage through the heating area is prevented and an image offering high image quality is obtainable.

What is claimed is:

1. An image forming apparatus comprising:

a toner-image holding unit for holding a toner image, a recording medium, transfer-fixing means for bringing the recording medium into contact with the toner image on said toner-image holding unit and heating the toner image so as to transfer and fix the toner image onto said recording medium, toner-image cooling means for cooling the toner image transferred and fixed onto the recording medium so as to suppress the flowing of the toner image, and peeling means for peeling the recording medium off said toner-image holding unit, the toner image on said toner-image holding unit has a predetermined number of lines per length; and given that the predetermined number of lines per length corresponding to the toner image is defined by d (lines/inch) and that the viscosity of toner is defined by η (Pa.s), the toner image is cooled by said toner-image cooling means in a manner satisfying $$\eta \geq 0.040\ d^2$$

until the toner image transferred and fixed by said transfer-fixing means onto said recording medium is peeled by said peeling means off said toner-image holding unit.

2. An image forming apparatus comprising:

a toner-image holding unit for holding a toner image, a recording medium, transfer-fixing means for bringing the recording medium into contact with the toner image on said toner-image holding unit and heating the toner image so as to transfer and fix the toner image onto said recording medium, toner-image cooling means for cooling the toner image transferred and fixed onto the recording medium so as to suppress the flowing of the toner image, and peeling means for peeling the recording medium off said toner-image holding unit, the toner image on said toner-image holding unit has a predetermined number of lines per length; and given that the predetermined number of lines per length corresponding to the toner image is defined by d (lines/inch) and that the viscosity of toner is defined by η (Pa.s), the toner image is cooled by said toner-image cooling means in a manner satisfying $$\eta \geq 0.055\ d^2$$

until the toner image transferred and fixed by said transfer-fixing means onto said recording medium is peeled by said peeling means off said toner-image holding unit.

3. An image forming apparatus comprising:

a toner-image holding unit for holding a toner image and conveying the toner image from a predetermined toner-image forming position to a predetermined toner-image transfer position, toner-image forming means for forming the toner image provided with a predetermined number of lines per length on said toner-image holding unit in the toner-image forming position, and transfer-fixing means for transferring and fixing the toner image onto a predetermined recording medium, the toner image being conveyed by said toner-image holding unit to the toner-image transfer position, while heating an object to be heated with a heating source in contact with at least one of said toner-image holding unit and the recording medium as such an object, wherein given that the predetermined number of lines per length corresponding to the toner image formed by said toner-image forming means is defined by d (lines/inch) and that the viscosity of molten toner is defined by η (Pa.s), said toner-image forming means forms the toner image by the use of toner always satisfying $$\eta \geq 0.040\ d^2$$

until the toner image on said toner-image holding unit is heat-melted and transferred onto the recording medium before being cooled.

4. The image forming apparatus of claim 3, wherein said toner-image forming means forms the toner image by the use of toner, in place of toner satisfying $\eta \geq 0.040\ d^2$, always satisfying $$\eta \geq 0.055\ d^2,$$

until the toner image on said toner-image holding unit is heat-melted and transferred onto the recording medium before being cooled.

5. An image forming apparatus comprising:

a toner-image holding unit for holding a toner image and conveying the toner image from a predetermined toner-image forming position to a predetermined toner-image transfer position, toner-image forming means for forming the toner image provided with a predetermined number of lines per length on the toner-image holding unit in the toner-image forming position, and transfer-fixing means for transferring and fixing the toner image onto a predetermined recording medium, the toner image being conveyed by said toner-image holding unit to the toner-image transfer position, while heating an object to be heated with a heating source in contact with at least one of said toner-image holding unit and the recording medium as such an object, wherein given that the predetermined number of lines per length corresponding to the toner image formed by said toner-image forming means is defined by d (lines/inch) and that the viscosity of molten toner is defined by η (Pa.s), cooling means is provided for cooling the toner image transferred by said transfer-fixing means onto the recording medium within 50 ms at latest after the object to be heated is separated from said heating source up to a state satisfying $$\eta \geq 0.040\ d^2.$$

6. The image forming apparatus of claim 5 comprising:

cooling means, in place of the aforesaid cooling means, for cooling the toner image transferred by said transfer-fixing means onto the recording medium within 50 ms at latest after the object to be heated is separated from said heating source up to a state satisfying $$\eta \geq 0.055\ d^2.$$

7. The image forming apparatus of claim 5, wherein said cooling means comprises:

a cooling portion which is brought into contact with and used for cooling an object to be cooled which is at least one of said toner-image holding unit and the recording medium in a position where the object to be heated passes therein within 50 ms after a point of time the object to be heated is separated from said heating source, and a radiating portion for radiating the heat taken from the object to be cooled.

8. The image forming apparatus of claim 7, wherein said cooling member is located so that the radiating portion is brought into contact with said toner-image holding unit which is being moved from the toner-image forming position toward the toner-image transfer position.

9. The image forming apparatus of claim 5, wherein
said cooling means comprises:
- a cyclic moving member which is situated in a position where the object to be heated passes within 50 ms after the point of time the object to be heated is separated from said heating source, and moved via a cooling position in contact with the object to be cooled which is one of said toner-image holding unit and the recording medium and via a radiating position where the heat taken from the object to be cooled is radiated.

10. The image forming apparatus of claim 9, wherein
said cyclic moving member is cyclically moved via the cooling position in contact with the object to be cooled where the object to be heated passes within 50 ms after the point of time the object to be heated is separated from said heating source and via the radiating position in contact with said toner-image holding unit which is being moved from the toner-image forming position toward the toner-image transfer position.

11. The image forming apparatus of claim 5, wherein
said cooling means comprises:
- an air-cooling unit for sending air to the object to be cooled which is at least one of said toner-image holding unit and the recording medium in the position where the object to be heated passes within 50 ms after the point of time the object to be heated is separated from said heating source.

* * * * *